US012688787B1

(12) United States Patent
Lynch et al.

(10) Patent No.: US 12,688,787 B1
(45) Date of Patent: Jul. 21, 2026

(54) MORTAR TRAINING SYSTEM FOR SIMULATED FIRING

(71) Applicant: By Light Professional IT Services LLC, McLean, VA (US)

(72) Inventors: Anthony Lynch, Geneva, FL (US); Dirk Harrington, Orlando, FL (US); David Jodeit, Orlando, FL (US); Edgar Madruga, Sanford, FL (US)

(73) Assignee: By Light Professional IT Services LLC, McLean, VA (US)

( * ) Notice: Subject to any disclaimer, the term of this patent is extended or adjusted under 35 U.S.C. 154(b) by 0 days.

(21) Appl. No.: 19/345,565

(22) Filed: Sep. 30, 2025

Related U.S. Application Data

(63) Continuation of application No. 19/316,648, filed on Sep. 2, 2025.

(51) Int. Cl.
| | |
|---|---|
| *G09B 9/00* | (2006.01) |
| *F41A 33/00* | (2006.01) |
| *F41G 3/26* | (2006.01) |
| *F41F 1/06* | (2006.01) |

(52) U.S. Cl.
CPC .............. *G09B 9/003* (2013.01); *F41A 33/00* (2013.01); *F41G 3/26* (2013.01); *F41F 1/06* (2013.01)

(58) Field of Classification Search
CPC .... F41A 33/00; F41G 3/26; F41F 1/06; G09B 9/003
See application file for complete search history.

(56) References Cited

U.S. PATENT DOCUMENTS

| | | | |
|---|---|---|---|
| 2,308,798 A | 1/1943 | Peiker | |
| 2,801,586 A | 8/1957 | Mongello | |
| 2,809,624 A | 10/1957 | Becher et al. | |
| 2,955,585 A | 10/1960 | Friedland et al. | |
| 6,029,573 A | 2/2000 | Capdeboscq | |

(Continued)

FOREIGN PATENT DOCUMENTS

| | | | | |
|---|---|---|---|---|
| KR | 200379240 Y1 * | 3/2005 | .............. | F41A 33/06 |
| KR | 10-2017-0045790 A | 4/2017 | | |

OTHER PUBLICATIONS

International Search Report and Written Opinion dated Dec. 4, 2025, directed to International Application No. PCT/US2025/049361; 13 pages.

(Continued)

*Primary Examiner* — Dmitry Suhol
*Assistant Examiner* — Alyssa N Brandley
(74) *Attorney, Agent, or Firm* — Morrison & Foerster LLP

(57) ABSTRACT

A mortar training device includes a barrel body including a bore; a shot detector contained in the barrel body and including a shot detection sensor and configured to output an electronic signal indicating a firing of an inert mortar projectile from the barrel body; a battery; a plurality of orientation sensors contained in the barrel body; and one or more processors and memory storing instructions that, when executed by the one or more processors, cause the one or more processors to receive the electronic signal from the shot detection sensor indicating that an inert mortar projectile is fired from the barrel body, and determine an elevation of the barrel body and an azimuth of the barrel body when the inert mortar projectile is fired from the barrel body based on sensor data received from the plurality of orientation sensors.

29 Claims, 16 Drawing Sheets

(56)     References Cited

U.S. PATENT DOCUMENTS

| | | | |
|---|---|---|---|
| 6,193,517 B1 | 2/2001 | Lazecki | |
| 8,006,427 B2 * | 8/2011 | Blevins | F41G 5/26 |
| | | | 89/41.17 |
| 9,921,035 B2 | 3/2018 | Jandl et al. | |
| 10,890,408 B2 | 1/2021 | Liu et al. | |
| 11,132,915 B1 * | 9/2021 | McIver et al. | G06F 3/011 |
| 2011/0252683 A1 | 10/2011 | Chedid et al. | |
| 2015/0083010 A1 | 3/2015 | Macdonald et al. | |
| 2016/0216072 A1 * | 7/2016 | McNeil | F41G 3/142 |
| 2016/0238344 A1 | 8/2016 | Jandl et al. | |
| 2018/0364006 A1 * | 12/2018 | Reymann | G01S 19/13 |
| 2018/0364007 A1 * | 12/2018 | Armstrong | F41A 33/00 |
| 2019/0285384 A1 * | 9/2019 | Reymann | F42B 8/20 |
| 2024/0093966 A1 | 3/2024 | Mcneil et al. | |

OTHER PUBLICATIONS

Lynch et al., U.S. Notice of Allowance dated May 11, 2026, directed to U.S. Appl. No. 19/316,648; 10 pages.

\* cited by examiner

400

401

400

110

300

103

MORTAR TRAINING SYSTEM FOR SIMULATED FIRING

CROSS-REFERENCE TO RELATED APPLICATIONS

This application is a continuation of U.S. application Ser. No. 19/316,648, filed Sep. 2, 2025, the entire contents of which are incorporated herein by reference.

FIELD

This disclosure relates generally to mortar devices and more specifically to mortars for combat training.

BACKGROUND

Combat training provides military personnel with the skills needed for real combat scenarios. Accordingly, it is important that the equipment used in combat training accurately mimics live weaponry so that the skills and habits that soldiers develop during training will be the same skills and habits that will be effective in actual combat. Training equipment that does not match the physical experience of operating live weaponry can have a detrimental training effect, resulting in soldiers being slower, unprepared, and less skilled when operating live weapons.

Combat training with a weapon such as a mortar also involves simulation of live firing to assess solider performance during training. As used herein, the phrase "simulation" (e.g., simulation of live firing) may refer to (a) the performance of weapons handling, loading, and firing using one or more facsimile weapon devices, such as an inert or dummy weapon and/or an inert or dummy round, and/or to (b) the electronic simulation of firing outcomes including outcomes regarding spatial trajectory information, temporal trajectory information, impact location(s), and/or simulated damage to targets from firing a round from a facsimile weapon device. Accurate simulation of live firing is important to determine whether soldiers are operating the mortars correctly and to help them improve in firing accuracy. Traditional simulations require soldiers to input data regarding the configuration (e.g., orientation) of the weaponry; however, the inputted data may not accurately capture the actual configuration of the weaponry due to last-minute adjustments or user error. As a result, the simulation results may be inaccurate and ineffective for training.

SUMMARY

Disclosed herein are systems, devices, and methods for accurately simulating live mortar systems. The disclosed systems, devices, and methods may simulate different modes of mortar firing and may use training mortar barrels and training mortar bomb devices, one or both of which may be equipped with sensors that enable the systems to accurately simulate mortar firing outcomes (e.g., trajectories). Sensors may be mounted internally to the training mortar barrel, such that the overall mortar device has the same external shape as a live-firing mortar device. The internal sensors may include shot detector sensors to determine when an inert mortar projectile is launched from a mortar barrel and orientation sensors to determine the orientation of the mortar barrel with high accuracy and precision at the time of firing. The disclosed systems, devices, and methods may electronically simulate firing outcomes, including simulating a mortar bomb trajectory using a combination of sensor data and location data to account for the effect of ground elevation on a simulated trajectory.

According to an aspect, an exemplary mortar training device comprises: a barrel body comprising a bore; a shot detector contained in the barrel body and comprising a shot detection sensor and configured to output an electronic signal indicating a firing of an inert mortar projectile from the barrel body; a battery; a plurality of orientation sensors contained in the barrel body; and one or more processors and memory storing instructions that, when executed by the one or more processors, cause the one or more processors to: receive the electronic signal from the shot detection sensor indicating that an inert mortar projectile is fired from the barrel body, and determine an elevation of the barrel body and an azimuth of the barrel body when the inert mortar projectile is fired from the barrel body based on sensor data received from the plurality of orientation sensors.

Optionally, the shot detector comprises a spring and the shot detector is configured to output the electronic signal based on a compression of the spring.

Optionally, the shot detection sensor comprises a barometric pressure sensor and is configured to output the electronic signal based on a barometric pressure data of an interior of the barrel body.

Optionally, the barometric pressure data comprises an instantaneous barometric pressure.

Optionally, the barometric pressure data comprises a time curve of barometric pressure.

Optionally, the mortar further comprises a firing pin extending lengthwise internally along a portion of the barrel body.

Optionally, the firing pin extends through a channel in the shot detector.

Optionally, the firing pin is connected to a trigger and the trigger is configured to move the firing pin in a longitudinal direction past the shot detector.

Optionally, the firing pin extends past the shot detector and is fixed in place.

Optionally, the instructions further cause the one or more processors to transmit the elevation and the azimuth to a remote device.

Optionally, the barrel body includes a first barrel section having a first threaded end and a second barrel section having a second threaded end, the first threaded end and the second threaded end being configured to mate with each other.

Optionally, the battery is contained in the barrel body at a mating location of the first barrel section and the second barrel section.

Optionally, the mortar further comprises an electronics housing containing the plurality of orientation sensors and the one or more processors.

Optionally, the electronics housing is at a base of an interior of the barrel body and an outer surface of the electronics housing includes a raised projection configured to fit in a corresponding slot in an inner surface of the barrel body.

Optionally, the mortar further comprises a threaded collar configured to fit over an upper section of the electronics housing and between the electronics housing and an inner surface of the barrel body to secure a position of the electronics housing in the barrel body.

Optionally, the battery is located between the electronics housing and the shot detector.

Optionally, the electronics housing is located between the battery and the shot detector.

According to an aspect, an exemplary method performed using a mortar training device comprising a barrel body comprising a bore; a shot detector contained in the barrel body and comprising a shot detection sensor and configured to output an electronic signal indicating a firing of an inert mortar projectile from the barrel body; a battery; a plurality of orientation sensors contained in the barrel body; and one or more processors and memory comprises receiving the electronic signal from the shot detection sensor indicating that an inert mortar projectile is fired from the barrel body, and determining an elevation of the barrel body and an azimuth of the barrel body when the inert mortar projectile is fired from the barrel body based on sensor data received from the plurality of orientation sensors.

According to an aspect, an exemplary simulation system for simulating firing of mortar bomb comprises: a mortar training device comprising: a barrel body comprising a bore; a shot detector contained in the barrel body and comprising a shot detection sensor and configured to output an electronic signal indicating a firing of an inert mortar projectile from the barrel body; a battery; and a plurality of orientation sensors contained in the barrel body; the inert mortar projectile; a mobile device; and a computing system comprising a memory and one or more processors, wherein the memory stores one or more programs that when executed by the one or more processors, cause the one or more processors to: receive orientation data, the orientation data including an elevation and an azimuth of the barrel body when the inert mortar projectile is fired from the barrel body; receive location data including a location of the mobile device; determine a ground elevation of the mobile device based on the location data; simulate a trajectory of a mortar bomb from a mortar based on the orientation data and the ground elevation of the mobile device; and determine a simulated impact location of the mortar bomb based on the simulated trajectory.

Optionally, one or more programs when executed further cause the one or more processors to simulate the trajectory based on data indicating a projectile type of the inert mortar projectile, a simulated firing charge associated with the inert mortar projectile, and/or a model type of the mortar.

Optionally, the data indicating the projectile type is received from a sensor in the mortar training device or the mobile device.

Optionally, the one or more programs when executed further cause the one or more processors to determine a ground elevation at the simulated impact location.

Optionally, the one or more programs when executed further cause the one or more processors to simulate damage caused by the mortar bomb based on the simulated impact location and the ground elevation at the simulated impact location.

Optionally, the one or more programs when executed further cause the one or more processors to transmit the simulated damage to the mobile device.

Optionally, the one or more programs when executed further cause the one or more processors to receive a target location and simulate the damage based on the simulated impact location, the ground elevation at the simulated impact location, and the target location.

Optionally, the inert mortar projectile includes a plastic body and at least one metal insert within the plastic body.

Optionally, the one or more programs when executed further cause the one or more processors to receive an indication that the inert mortar projectile was fired from the barrel body and to responsively transmit a request for the location data to the mobile device.

Optionally, the computing system comprises a remote server configured to communicate with the mobile device via a wireless communication protocol.

According to an aspect, an exemplary method of using a simulation system for simulating firing of a mortar bomb, the simulation system comprising a mortar comprising a barrel body comprising a bore, a shot detector contained in the barrel body and comprising a shot detection sensor and configured to output an electronic signal indicating a firing of an inert mortar projectile from the barrel body, a battery, and a plurality of orientation sensors contained in the barrel body; the inert mortar projectile; a mobile device; and a computing system comprising a memory and one or more processors comprises: receiving orientation data, the orientation data including an elevation and an azimuth of the barrel body when the inert mortar projectile is fired from the barrel body; receiving location data including a location of the mobile device; determining a ground elevation of the mobile device based on the location data; simulating a trajectory of a mortar bomb from the barrel body of the mortar based on the orientation data and the ground elevation of the mobile device; and determining a simulated impact location of the mortar bomb based on the simulated trajectory.

In some embodiments, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

A better understanding of the features and advantages of the present disclosure will be obtained by reference to the following detailed description that sets forth illustrative embodiments, in which the principles of the disclosure are utilized, and the accompanying drawings of which.

DETAILED DESCRIPTION

Figure 1A:
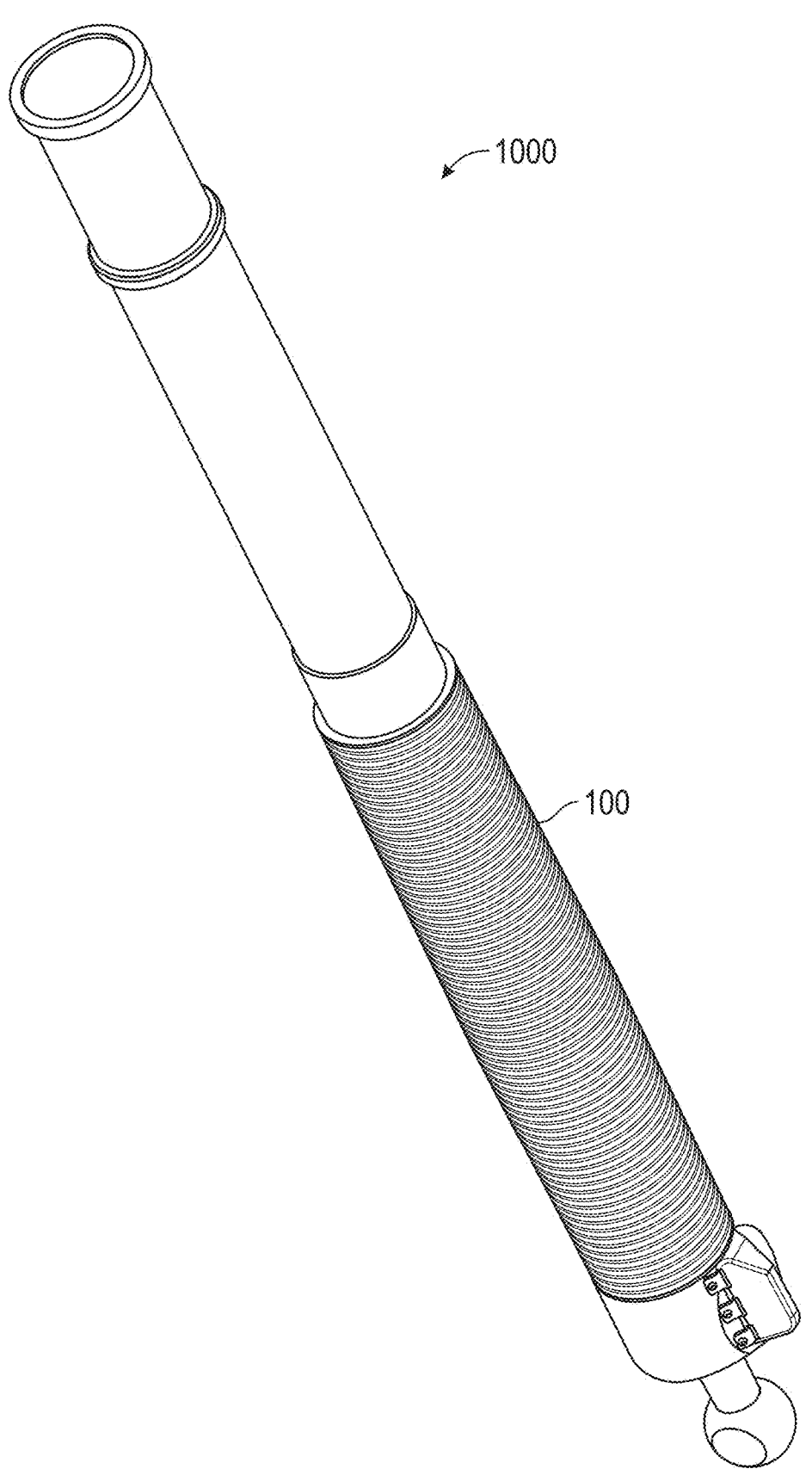
FIG. 1A illustrates a mortar according to some examples.

Disclosed herein are systems, devices, and methods for firing pneumatically powered mortar projectiles that do not carry an explosive payload, referred to herein as inert mortar projectiles, from a mortar and simulating a trajectory of live mortar bombs based on the orientation and location of the mortar barrel when the pneumatic inert mortar projectiles are fired. The mortar may include an automatic firing mechanism and a trigger-activated firing mechanism to train soldiers on both types of systems. The mortar may include internal shot detector sensors to determine when an inert mortar projectile is loaded into the barrel and when an inert mortar projectile is fired from the barrel. The mortar may include orientation sensors to determine an orientation (elevation and azimuth) of the mortar when a firing is detected. The orientation sensors may be contained in the barrel body of the mortar. As described herein, components that are contained in the barrel or barrel body may be within the bore of the barrel body or may be elsewhere within the barrel body. The orientation sensors contained in the mortar are more accurate than externally-mounted sensors or user-inputted orientation data. The internal components of the mortar barrel surrounding the orientation sensors may be configured for a secure fit to ensure the accuracy of the orientation sensors. The disclosed systems, devices, and methods may be used to train users on processes such as transporting a mortar, configuring the fuse on a mortar bomb, aiming a mortar, maintaining the orientation of a mortar during firing, drop firing, trigger firing, handling misfires, and other key steps that typically occur during mortar operations. The disclosed systems, devices, and methods may also be used to identify poor tactics, techniques, and procedures (TTPs) that are employed during training. Poor TTPs are easily identifiable using the disclosed systems, devices, and methods because the accurate trajectory simulation indicates when mortar bombs do not reach their intended target.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems will appear from the description below. In addition, the present invention is not described with reference to any particular programming language. It will be appreciated that a variety of programming languages may be used to implement the teachings of the present disclosure as described herein.

FIG. 1A illustrates a mortar 1000 according to some embodiments. The mortar 1000 may be used to fire inert mortar projectiles (e.g., projectiles that are shaped or sized similarly to live mortar bombs but that do not contain a combustible or explosive material) in a manner that simulates the firing of "live" mortar bombs (e.g., projectiles that contains a combustible or explosive material). The mortar 1000 may be configured such that its physical characteristics and methods of operating (loading, aiming, triggering, etc.) are highly similar to those of a mortar that is used to fire live mortar bombs. The mortar 1000 may therefore be used for effective combat training such that the skills that a user develops while operating the mortar 1000 are the same skills that the user would need to operate a mortar to fire a live mortar bomb.

Figure 1B:
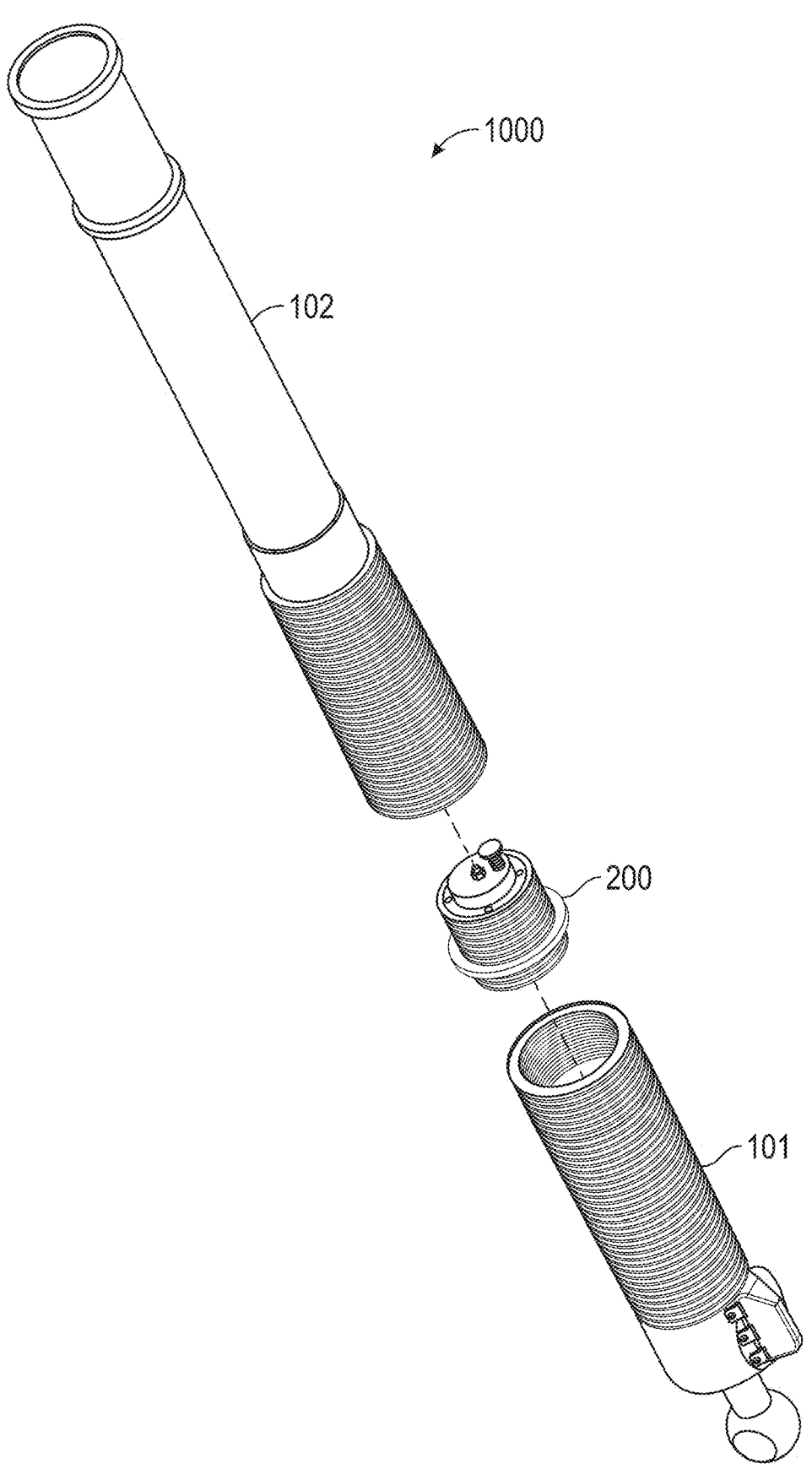
FIG. 1B illustrates an exploded view of a mortar according to some examples.

The mortar 1000 may include a mortar barrel 100. The mortar barrel 100, as used herein, may comprise a barrel body comprising a bore. The mortar barrel 100 may be a cylindrical barrel having one or more internal chambers (e.g., in the bore) to hold a firing mechanism, a shot detector, and electronics. The mortar barrel 100 may comprise two or more barrel sections that may be coupled together. For example, FIG. 1B is an exploded view of the mortar 1000 of FIG. 1A according to some embodiments. The mortar barrel 100 includes a lower barrel section (first barrel section) 101 and an upper barrel section (second barrel section) 102. The first barrel section 101 may include a threaded opening that is coupled to a threaded opening of the second barrel section 102. Other coupling mechanisms, such as snap-fit joint, may be used. The barrel sections may be separable so that internal components, such as a battery, may be easily removed from one of the barrel sections. In some embodiments, the mortar barrel 100 may include a hatch that can be opened to access internal components.

In some embodiments, the inner diameter of the mortar barrel 100 may be between approximately 77 millimeters (mm) to approximately 79 mm. The mortar barrel 100 may be slightly (e.g., approximately 2.5%) subcaliber compared to mortar barrels used to fire live mortar bombs. The smaller dimensions of the mortar barrel 100 prevent live mortar bombs from being inserted into the mortar barrel while still providing an accurate simulated firing experience. In some embodiments, the mortar barrel 100 may be composed of aluminum and mild steel. The weight of the mortar barrel 100 may be similar to the weight of a live mortar barrel, but the material may be less durable than that of a live mortar barrel in order to reduce manufacturing costs.

The exploded view of FIG. 1B illustrates a shot detector 200 that may be used to detect when an inert mortar projectile is placed inside the mortar barrel and when the inert mortar projectile is fired from the mortar barrel. The shot detector 200 may be contained in the barrel body. The shot detector 200 may be located in the upper barrel section 102 when the mortar barrel is assembled.

Figures 2A, 2B:
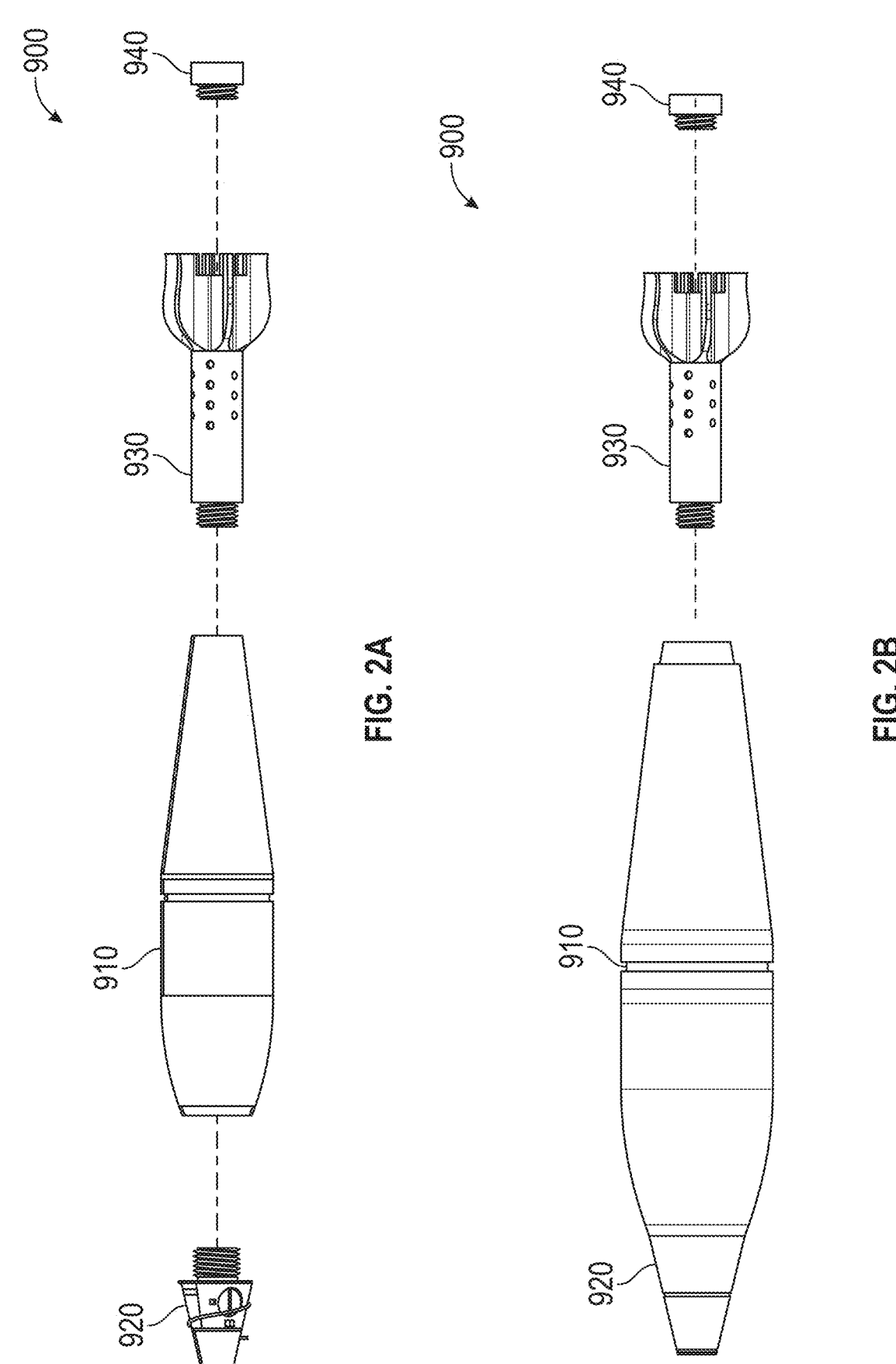
FIG. 2A illustrates an exploded view of an inert mortar projectile according to some examples.
FIG. 2B illustrates an exploded view of an inert mortar projectile according to some examples.

FIG. 2A illustrates an inert mortar projectile 900 of the system according to some embodiments. The inert mortar projectile 900 may include an outer body 910, a fuse simulator 920, a tail fin section 930, and a pneumatic cartridge retainer 940. The fuse simulator 920 may be a removable cap that is threaded onto the outer body 910 and that includes a toggle mechanism such as a knob, dial, rotatable component, or switch. The toggle mechanism may be used for training accuracy because live mortar bombs often include a functional fuse that controls live firing. The fuse simulator 920 may be a plastic or metal cap. The inert mortar projectile 900 may contain a pneumatic cartridge containing a pressurized gas such as carbon dioxide. The pneumatic cartridge provides a propulsion force for the inert mortar projectile when the pressurized air is released. The inert mortar projectile is then launched out of the mortar barrel and may travel a short distance from the mortar barrel to simulate the firing of a live mortar bomb. The pneumatic cartridge may be replaced after usage so that the inert mortar projectile can be reused. The pneumatic cartridge may also be removed from the inert mortar projectile in order to simulate a misfire when the inert mortar projectile is loaded into the mortar barrel but does not launch. An empty/used pneumatic cartridge within the mortar body may also be used to simulate the misfire.

Pressurized gas may be released when the pneumatic cartridge in the inert mortar projectile 900 is punctured, e.g., with a firing pin. The firing mechanism may be automatic or manual as will be described in further detail below. The firing pin mimics the firing mechanism of a live mortar. In a live mortar firing of a live mortar bomb, a primer (e.g., a shock-sensitive chemical) may be ignited by a firing pin within the mortar barrel. The primer then initiates a combustion reaction within the live mortar bomb that provides a propulsion force. In a similar manner, the pneumatic cartridge of the inert mortar projectile 900 provides a propulsion force that is initiated by a firing pin. However, the propulsion force provided by the pneumatic cartridge is much less than the propulsion force in a live mortar bomb so that the inert mortar projectile does not fire as far, poses less danger, and can more be easily retrieved and reused in further training. The similarities between the firing mechanism of the inert mortar projectile 900 and the firing mechanism of a live mortar bomb are useful for accurate simulation of mortar firing and of misfires that may be caused by a defect in the inert mortar projectile or the firing pin. The simulated firing may be effective for training without the risk or cost of combustible materials.

FIG. 2B illustrates an inert mortar projectile 900 of the system according to some embodiments. In order to provide an accurate training experience, the inert mortar projectile 900 should approximately match the weight and tactility of a live mortar bomb. In some embodiments, the outer body 910 of the inert mortar projectile may be composed of a metal such as aluminum. However, a metal body may be easily damaged upon impact. Accordingly, in some embodiments, the outer body 910 of the inert mortar projectile 900 may be plastic. The outer body 910 may include metal inserts to increase the weight of the inert mortar projectile 900. The metal inserts may include a high-density metal such as steel. The metal inserts may be removable so that the weight of the inert mortar projectile 900 can be adjusted. As an example, the inert mortar projectile 900 may weigh approximately 4.6 pounds when being used for trigger firing. In another example, the inert mortar projectile 900 may weigh approximately 9.7 pounds to match certain live mortar bombs. A larger or heavier inert mortar projectile may be more accurate for drop-firing simulations.

Figure 3:
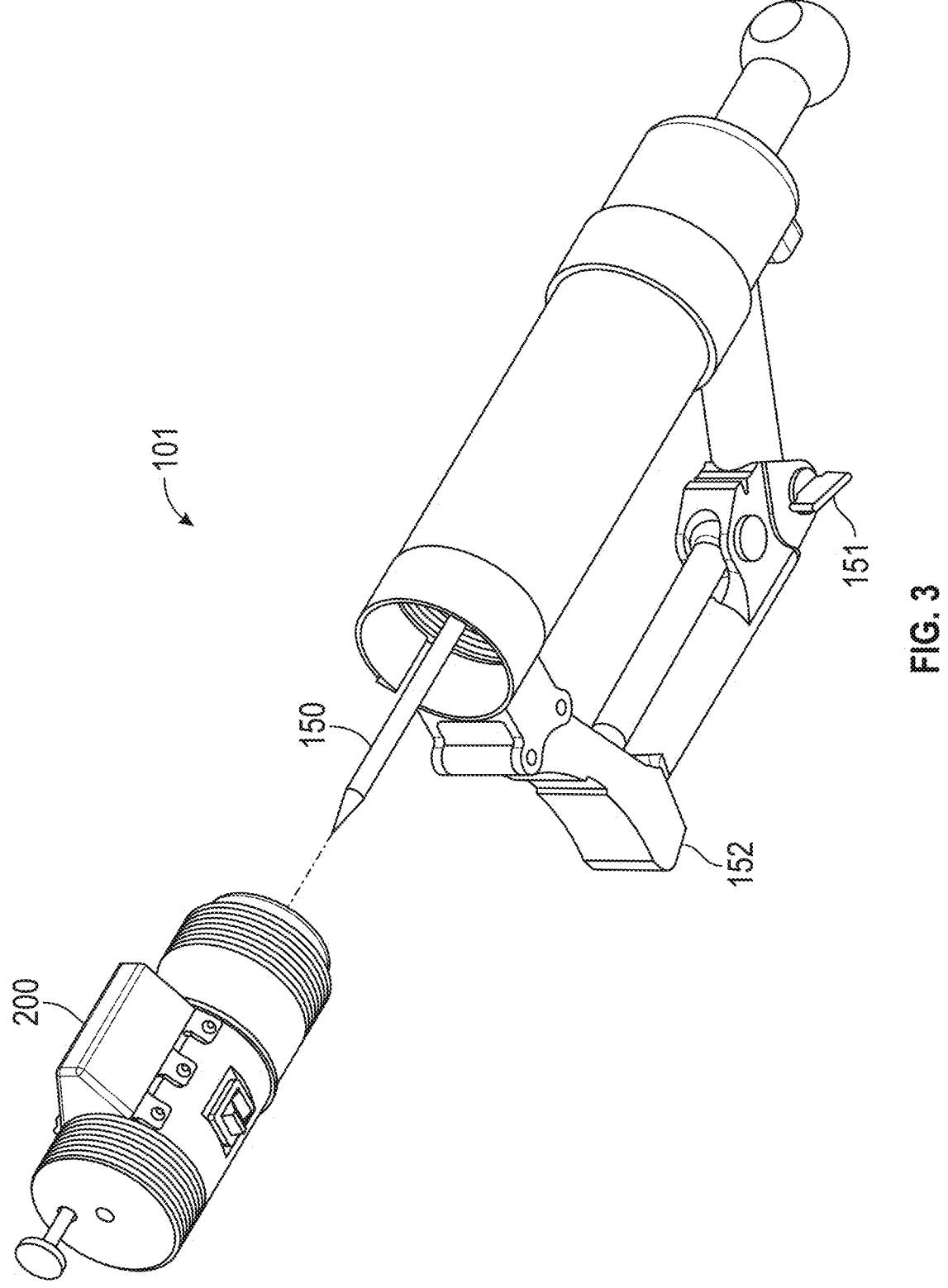
FIG. 3 illustrates internal components of a mortar according to some examples.

FIG. 3 is an illustration of a first barrel section 101, a firing pin 150, and a shot detector 200 according to some embodiments. The firing pin 150 may extend lengthwise along the interior of the mortar barrel and through an internal channel in the shot detector 200. The firing pin 150 may puncture the pneumatic cartridge of the inert mortar projectile to trigger the firing of the inert mortar projectile. In some embodiments, the firing pin 150 may be fixed in a position where the pointed tip of the firing pin 150 extends past the shot detector 200. The fixed position enables drop firing. In drop firing, the inert mortar projectile is dropped (loaded) into the mortar barrel and lands on the firing pin, resulting in the firing pin automatically puncturing the pneumatic cartridge and launching the inert mortar projectile out of the mortar barrel. In other embodiments, the position of the firing pin 150 may be adjustable. The firing pin 150 may be retracted to a first position wherein the pointed tip of the firing pin 150 does not extend past the shot detector 200. The firing pin 150 may then be advanced to a second position (e.g., the fixed position used for drop firing) wherein the pointed tip of the firing pin 150 does extend past the shot detector 200.

The position of the firing pin 150 may be set using a trigger 151 that is external to the mortar barrel. The trigger may include a knob, dial, switch, lever, or other toggle mechanism located on a trigger handle 152. The trigger 151 may be physically connected to the firing pin 150 so that toggling the position or state of the trigger changes the position of the firing pin 150. The adjustment of the firing pin position enables trigger firing. In trigger firing, the firing pin 150 is initially retracted in the first position when the inert mortar projectile is loaded into the barrel. A user then toggles the trigger 151 to advance the firing pin 150 past the shot detector 200 and puncture the pneumatic cartridge of the inert mortar projectile for firing. In some embodiments, the trigger 151 may be used to lock the firing pin 150 in the retracted position to prevent any unwanted firing. In some embodiments, the firing pin 150 may be locked in an advanced position for drop firing.

Figure 4:
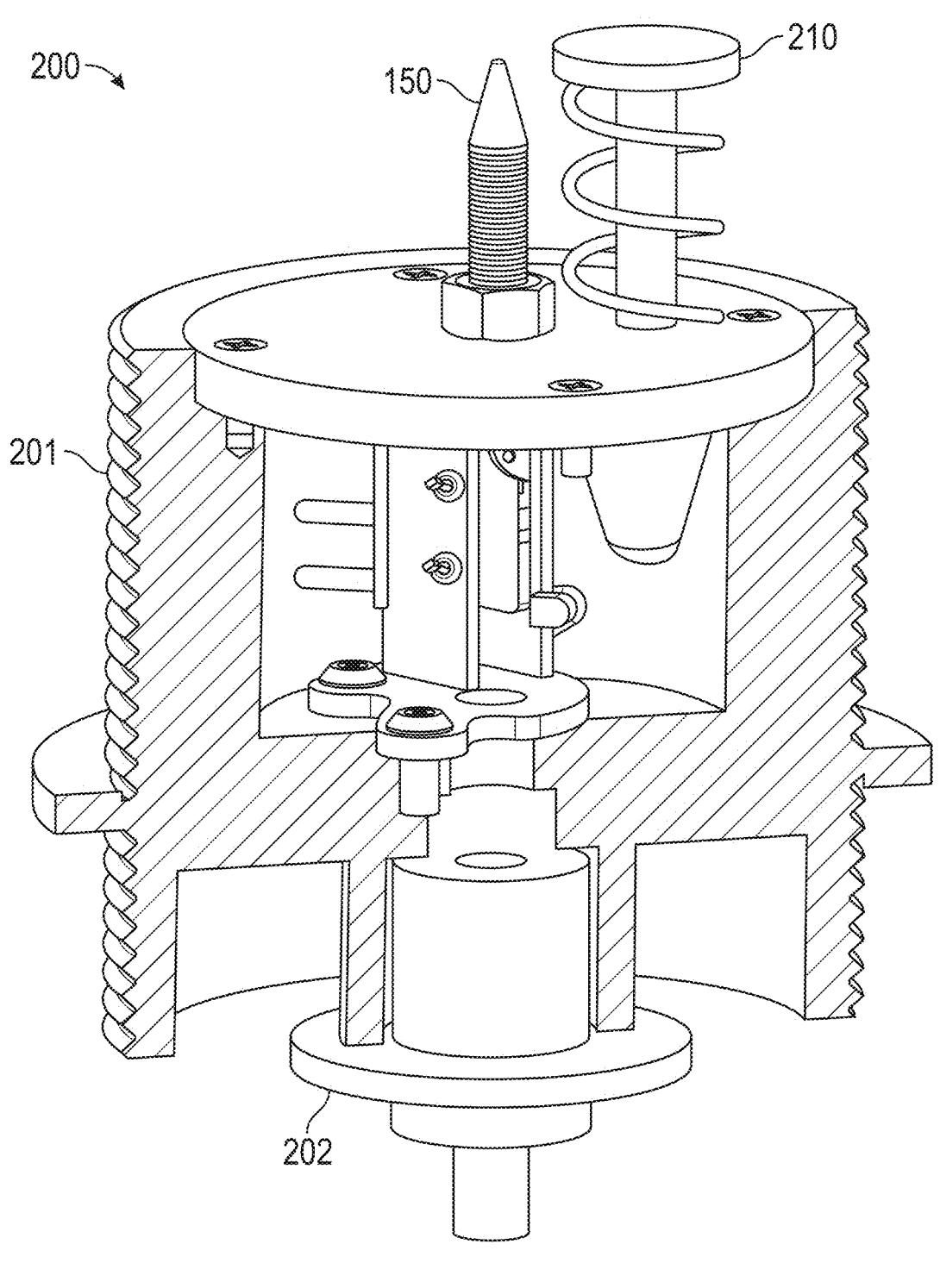
FIG. 4 illustrates a shot detector according to some examples.

FIG. 4 is an illustration of a shot detector 200 according to some embodiments. The shot detector 200 may detect when an inert mortar projectile is dropped into the mortar barrel and when an inert mortar projectile is launched from the mortar barrel. The shot detector 200 may include one or more shot detector sensors. The one or more shot detector sensors may be contained in the housing 201 of the shot detector. In some embodiments, the shot detector 200 may include at least one spring-loaded plunger 210. In some embodiments, the shot detector 200 may include more than one spring-loaded plunger. The resting position of the plunger 210 may be above the housing 201 of the shot detector 200, as illustrated in FIG. 3. When an inert mortar projectile is loaded into the mortar barrel, it depresses the plunger 210 and compresses the spring. The first change (depression) in the position of the plunger and/or the compression of the spring may be detected by the one or more shot detector sensors to indicate that an inert mortar projectile is in the mortar barrel. The one or more shot detector sensors may include a mechanical switch positioned below the plunger. The mechanical switch may be connected to shot detector circuitry that is configured to output or transmit an electronic signal based on a state of the mechanical switch (e.g., open or closed). (As used herein, outputting or transmitting an electronic signal may include, in some embodiments, ceasing transmission of a previously transmitted electronic signal.) When the plunger is depressed, it may press down on the mechanical switch, resulting in a first electronic signal being outputted/transmitted by the shot detector circuitry. The first electronic signal may indicate that the inert mortar projectile has been loaded into the mortar barrel. When the inert mortar projectile is fired, the plunger 210 returns to its resting position and the spring expands. The second change (elevation) in position of the plunger and/or the expansion of the spring may be detected by the one or more shot detector sensors to indicate that the inert mortar projectile has been fired. For example, the plunger may no longer be in contact with the mechanical switch in the resting position, resulting in a second electronic signal being outputted/transmitted by the shot detector circuitry. The second electronic signal may indicate that the inert mortar projectile has been fired. The electronic signal may be a digital signal. In a misfire simulation, the one or more shot detector sensors may transmit an electronic signal indicating that an inert mortar projectile was loaded (the first change in position occurred) but did not fire (the second change in position did not occur).

In some embodiments, the shot detector may include a slip ring 202 at the base of the housing 201. The one or more processors may be located below the shot detector. The one or more shot detector sensors may be connected to the one or more processors via a wired connection that runs through the slip ring. The slip ring enables rotation of the shot detector housing during assembly or operation of the mortar barrel without tangling or putting strain on the wired connection.

In some embodiments, the one or more shot detector sensors may include barometric (or atmospheric) pressure sensors configured to measure the barometric pressure inside the mortar barrel. The barometric pressure sensors may be contained in the housing of the shot detector or may be located in the chamber of the mortar barrel. Loading an inert mortar projectile into the mortar barrel changes the pressure inside the mortar barrel and creates a pressure profile (a first pressure profile) that may be detected by the barometric pressure sensors. A pressure profile may be a time series of pressure readings from one or more barometric pressure sensors. The pressure profile may be represented as a time-dependent graph or curve. In some embodiments, the pressure readings in the pressure profile may be a combination of sensor data from multiple barometric pressure sensors. For example, the pressure readings may be an average pressure reading across multiple barometric pressure sensors within the mortar barrel. In other embodiments, the pressure readings in the pressure profile may be from a single barometric pressure sensor.

Firing an inert mortar projectile from the mortar barrel also changes the pressure inside the mortar barrel and creates a pressure profile (a second pressure profile) that may be detected by the barometric pressure sensors. The second pressure profile may include, for example, a large spike in barometric pressure due to the release of pressurized gas from the pneumatic cartridge.

A pressure profile that is acquired by the barometric pressure sensors may be used to determine whether an inert mortar projectile has been dropped into or fired from the mortar barrel. In some embodiments, the determination may include a comparison between an acquired pressure profile and known pressure profiles corresponding to mortar loading or mortar firing. In some embodiments, the barometric pressure sensors may compare the acquired pressure profile to known pressure profiles. When an acquired pressure profile matches one or more characteristics of a known pressure profile, the barometric pressure sensors may transmit an electronic signal to one or more processors in the mortar to indicate that an inert mortar projectile has been loaded or fired. The characteristics of a pressure profile may include an absolute or relative pressure measurement, a change in pressure, a rate of change, a curve shape characterizing pressure over time, and/or other parameters that may be extracted from a time series of pressure data. In some embodiments, the barometric pressure sensors may transmit an acquired pressure profile to the one or more processors, and the one or more processors may compare the acquired pressure profile with known pressure profiles to determine whether an inert mortar projectile has been loaded or fired. In a misfire simulation, the barometric pressure sensors may transmit an electronic signal indicating that an inert mortar projectile was loaded (a first pressure profile was acquired) but did not fire (a second pressure profile was not acquired). In some embodiments, the shot detector may detect when an inert mortar projectile is loaded or fired from the mortar barrel based on an instantaneous pressure reading by one or more barometric pressure sensors.

The barometric pressure inside the mortar barrel may be dependent on a type of inert mortar projectile that is used. For example, a pressure reading or pressure profile may be specific to an inert mortar projectile of a certain weight. As noted above, it may be advantageous to use inert mortar projectiles that have approximately the same weight as a live mortar bomb. In some embodiments, pressure-based shot detection may require fewer mechanical components in the shot detector and may therefore be easier to manufacture and maintain.

Figure 5:
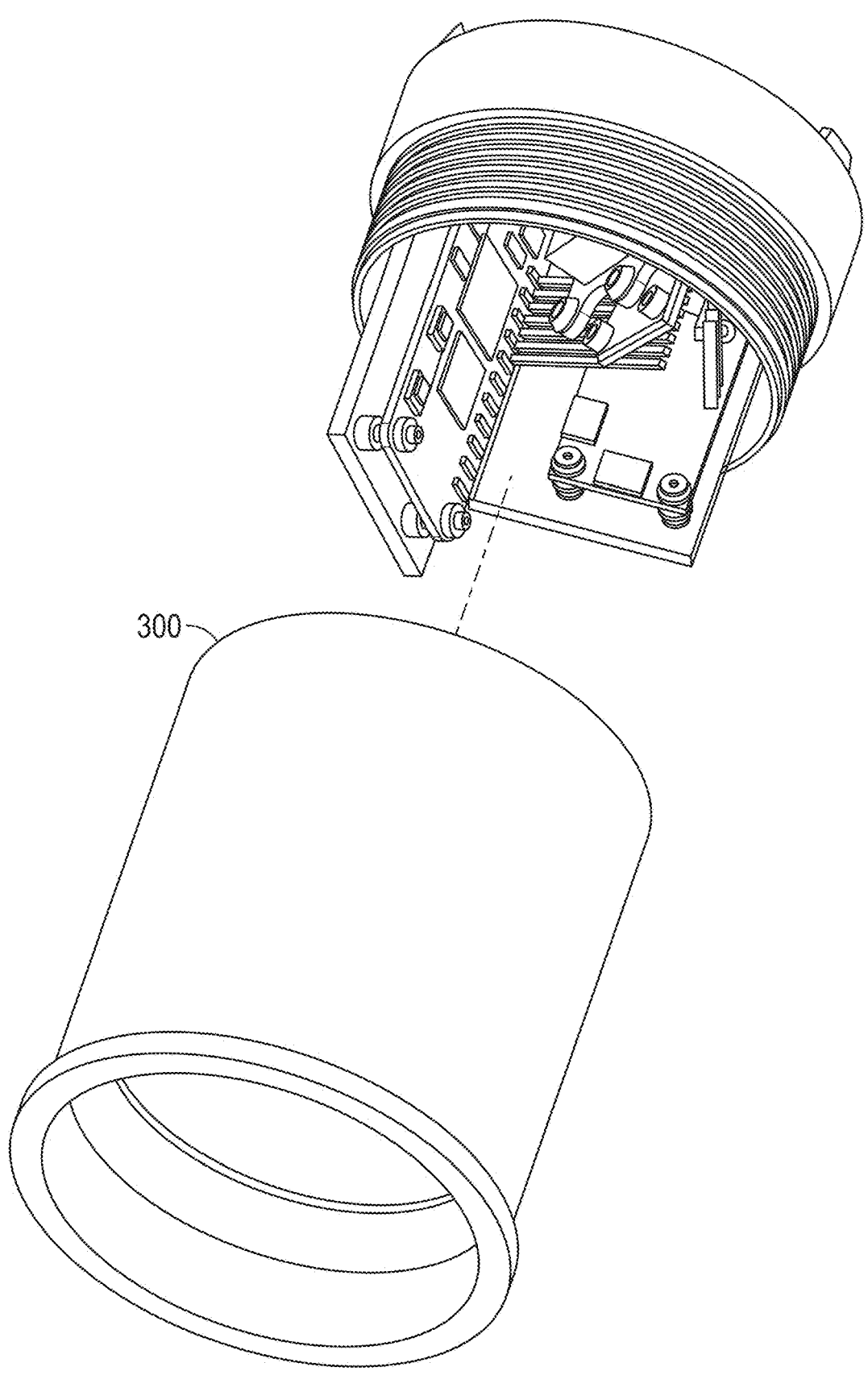
FIG. 5 illustrates an electronics housing according to some examples.

FIG. 5 is an illustration of an electronics housing 300 according to some embodiments. The electronics housing 300 may include one or more orientation sensors configured to determine an orientation of the mortar barrel. The orientation sensors may include one or more gyroscopes, accelerometers, and/or magnetometers. The orientation sensors may include an attitude and heading reference system (AHRS) and/or an inertial measurement unit (IMU). For example, the orientation sensors may include a SPARTON AHRS-M2 and/or a BOSCH BNO055 IMU with nine degrees of freedom (DOF). The orientation of the mortar barrel may include an elevation (vertical angle) of the mortar barrel and azimuth (horizontal angle) of the mortar barrel. The elevation may be determined relative to a fully horizontal position of the mortar barrel. The azimuth may be determined relative to a magnetic north. The orientation of the mortar barrel may be defined according to vertical, lateral, and longitudinal axes.

The electronics housing 300 may include one or more processors. The electronics housing 300 may include memory storing instructions that may be executed by the one or more processors. The one or more processors may receive sensor data from the sensors in the mortar barrel, including the orientation sensors and the shot detector sensors. Based on the sensor data, the one or more processors may determine an orientation of the mortar barrel when an inert mortar projectile is fired from the mortar barrel. The orientation of the mortar barrel may be used to simulate a trajectory of an inert mortar projectile that is fired from the mortar barrel, as will be discussed in greater detail below. Determining the actual orientation of the mortar barrel at the time that the inert mortar projectile is fired is important for an accuracy trajectory simulation. Furthermore, internal orientation sensors that are contained within the barrel body may be more accurate and less susceptible to electromagnetic interference than optical sensors or other sensors that are external to the mortar barrel.

Figure 6:
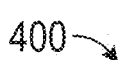
FIG. 6 illustrates a battery according to some examples.
Figure 6:
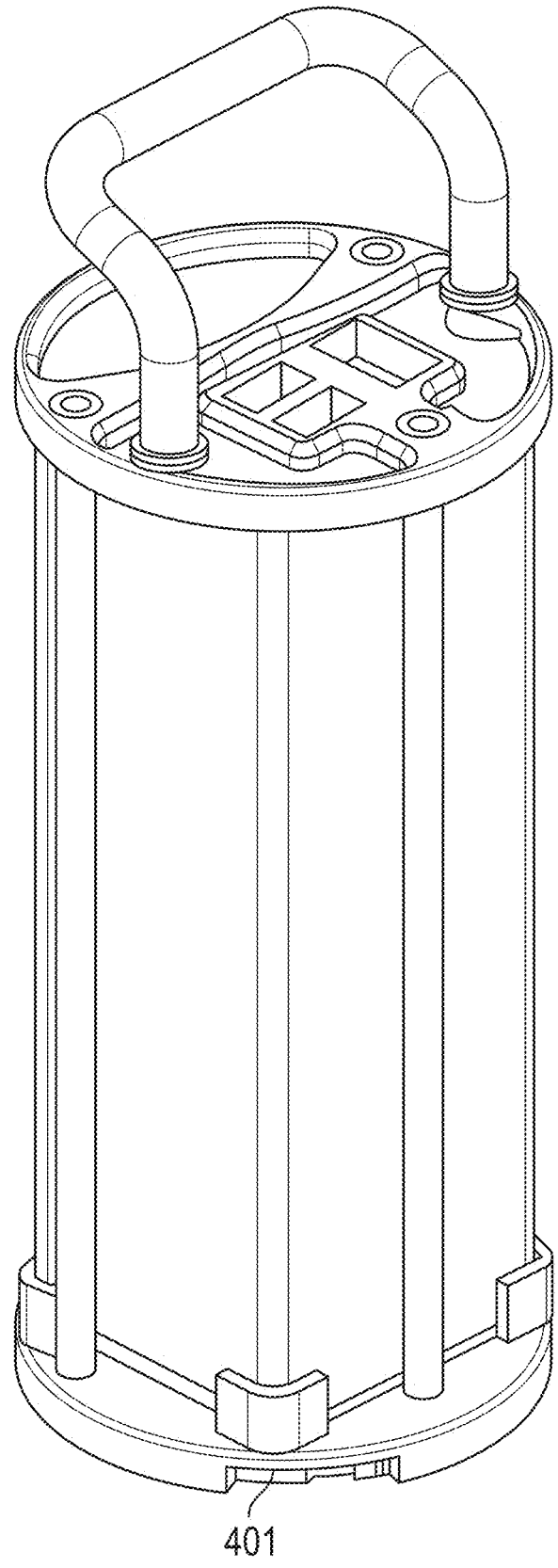

FIG. 6 is an illustration of a battery 400 according to some embodiments. The battery 400 may be a rechargeable battery. The battery housing may include one or more notches 401 to orient and/or lock the battery to adjacent components. The notches may be located at the bottom and/or top ends of the battery. The surface of the battery housing may include one or more lengthwise grooves for wiring. Adjacent components, e.g., a shot detector above the battery and one or more processors below the battery, may be connected with wires that are routed along the one or more grooves to circumvent the battery. In this manner, the battery may be placed between components that are wired together without obstructing the wiring.

Figure 7:
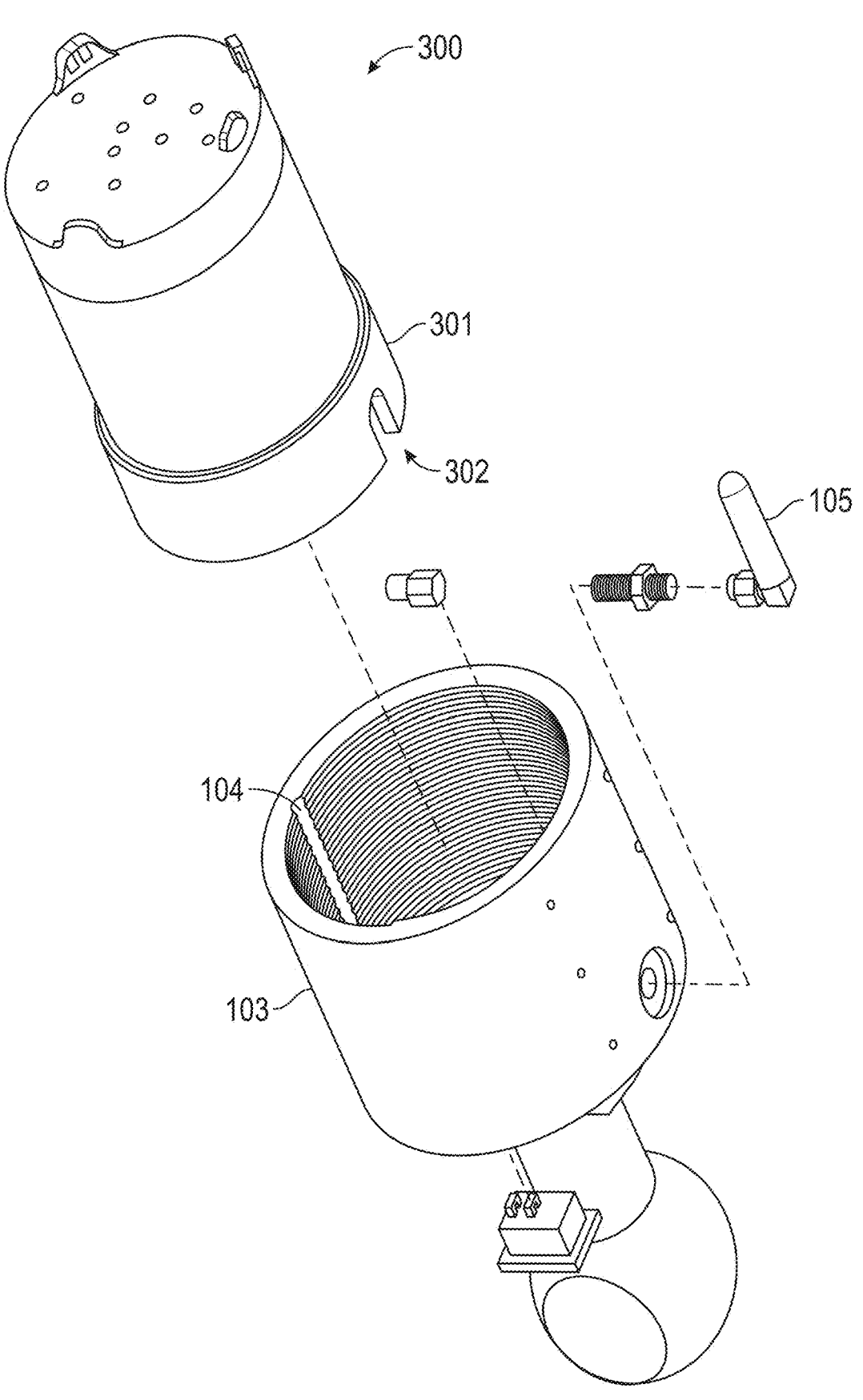
FIG. 7 illustrates an exploded view of a base of a mortar barrel according to some examples.

FIG. 7 is an illustration of the base 103 of the mortar barrel according to some embodiments. The electronics housing 300 may be contained in the base of the mortar barrel. The electronics housing 300 may include a wider base 301 that forms a ledge between the base 301 and the remaining body of the electronics housing. In some embodiments, the top and/or bottom of the electronics housing may include one or ore tabs 302 to orient and/or lock the electronics housing to adjacent components. The electronics housing 300 may include an alignment feature such as a notch, a projection, a knob, a groove, a ridge, an opening, or a similar discontinuity that aligns with a corresponding alignment feature in the base of the mortar barrel. The alignment features may ensure that the electronics housing 300 can only be inserted into the mortar barrel in a fixed number of orientations (e.g., a single orientation). The alignment features may also lock the position of the elec- tronics housing once the electronics housing is inserted. The fixed orientation and position of the electronics housing is especially important given that the electronics housing con- tain high-fidelity orientation sensors that are very sensitive to changes in orientation. As an example, FIG. 7 illustrates that the internal wall of the base 103 includes a slot or groove 104 as an alignment feature. The base 301 of the electronics housing may include a raised projection that fits into the groove as a corresponding alignment feature. In some embodiments, the electronics housing 300 may only be inserted into the base 301 when the projection and the groove 104 align. Once the electronics housing 300 is inserted, it will not rotate because the projection is fitted into the groove and cannot move laterally.

In some embodiments, the base 103 of the mortar barrel may include an antenna 105. The antenna may be removably coupled to the one or more processors in the electronics housing and may enable wireless transmission of data to and from the one or more processors.

Figure 8:
FIG. 8 illustrates internal components of a mortar according to some examples.

FIG. 8 is an illustration of the base 103 of the mortar barrel according to some embodiments. The internal diam- eter of the base 103 may be approximately the same as the outer diameter of the wider base 301 of the electronics housing 300. As a result, there may be a gap between the (narrower) body of the electronics housing and the internal wall of the base 103 when the electronics housing is inserted. A collar 110 may be inserted into the gap between the electronics housing 300 and the base 103 in order to secure the position of the electronics housing. The collar 110 may be threaded to mate with the threads on the inner wall of the base 103 (illustrated in FIG. 7). A section of the mortar barrel may then be threaded over a top portion of the collar 110. The collar 110 may provide water resistance for the electronics housing 300.

In some embodiments, the battery 400 may be positioned above the electronics housing 300. The notches at the base of the battery 400 may align with and lock into place with the tabs at the top of the electronics housing 300. The battery 400 may also be contained in the collar 110. A wired power connection between the electronics housing 300 and the battery 400 may be provided at the top of the electronics housing and the base of the battery 400.

Figure 9:
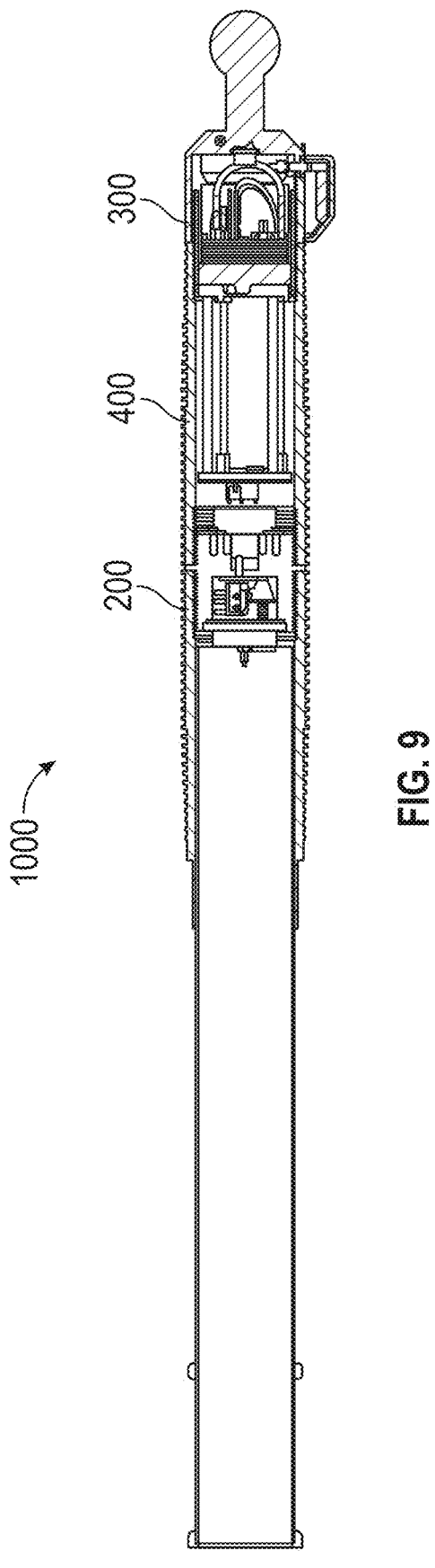
FIG. 9 illustrates a cross-sectional view showing internal components in a mortar according to some examples.

FIG. 9 is a transparent view of the mortar barrel according to some embodiments. The electronics housing 300 may be contained at the base of the mortar barrel, and the battery 400 may be positioned on top of the electronics housing 300. The shot detector 200 may be positioned above the battery 400. A wired power connection between the battery 400 and the shot detector 200 may be provided at the top of the battery 400 and the base of the shot detector 200. Wiring from the shot detector may be routed around the sides of the battery 400 to be connected to the electronics housing 300. The mortar barrel may include a first barrel section and a second barrel section. In some embodiments, the shot detec- tor 200 may be positioned at or around a mating location where the first barrel section and the second barrel section are joined together, as illustrated in FIG. 9. The external surface of the top and bottom of the shot detector may be threaded, as illustrated in FIG. 4, so that the first barrel section and/or the second barrel section may be threaded onto the shot detector. In some embodiments, other internal components may be located at or around the mating location where the first barrel section and the second barrel section are joined. For example, the battery may be located at the mating location so that the battery may be easily removed for charging or replacement. In other embodiments, the electronics housing may be located at the mating location.

Figure 10A:
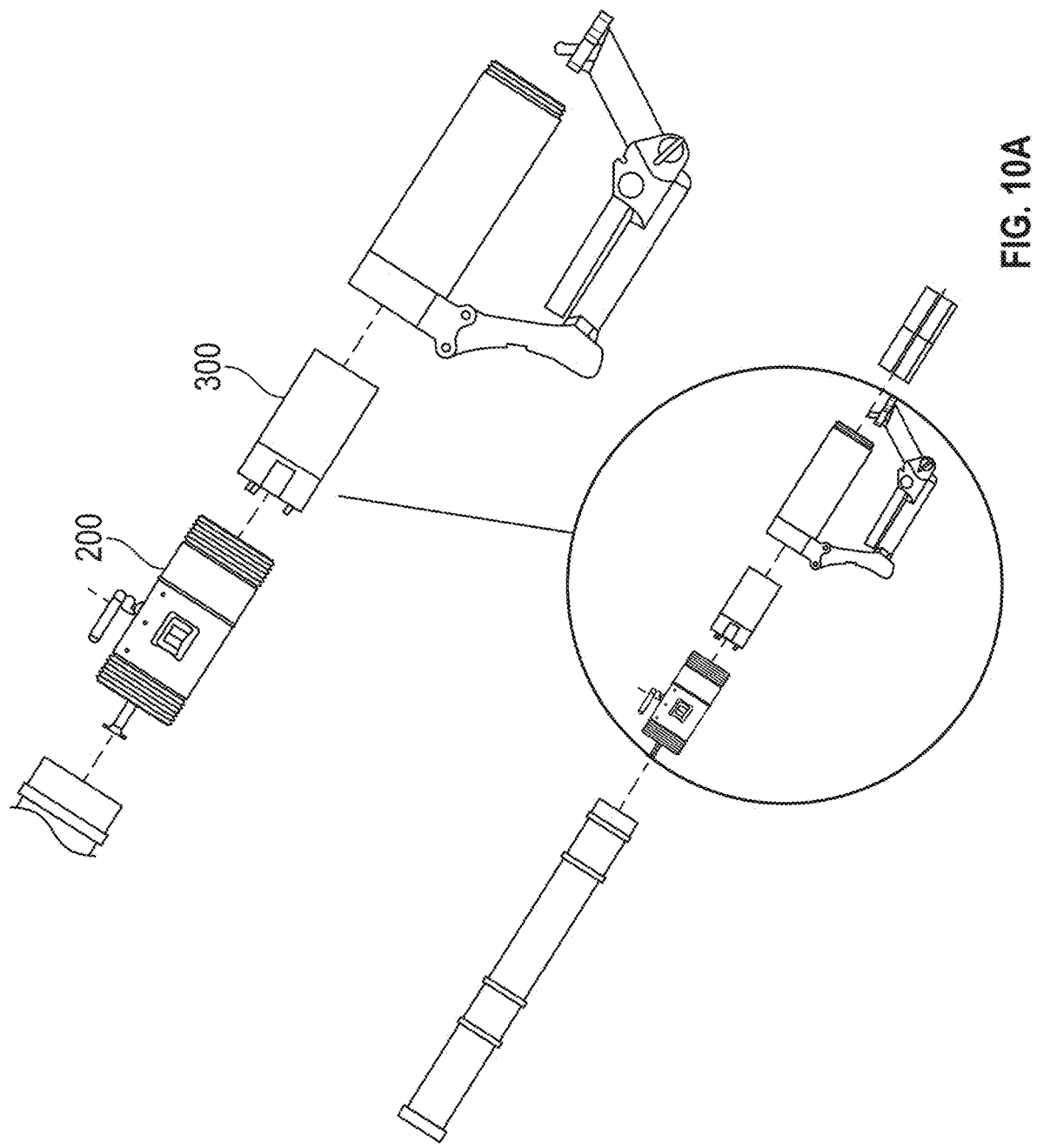
FIG. 10A illustrates a configuration of internal components and a trigger fire mechanism in a mortar according to some examples.
Figure 10B:
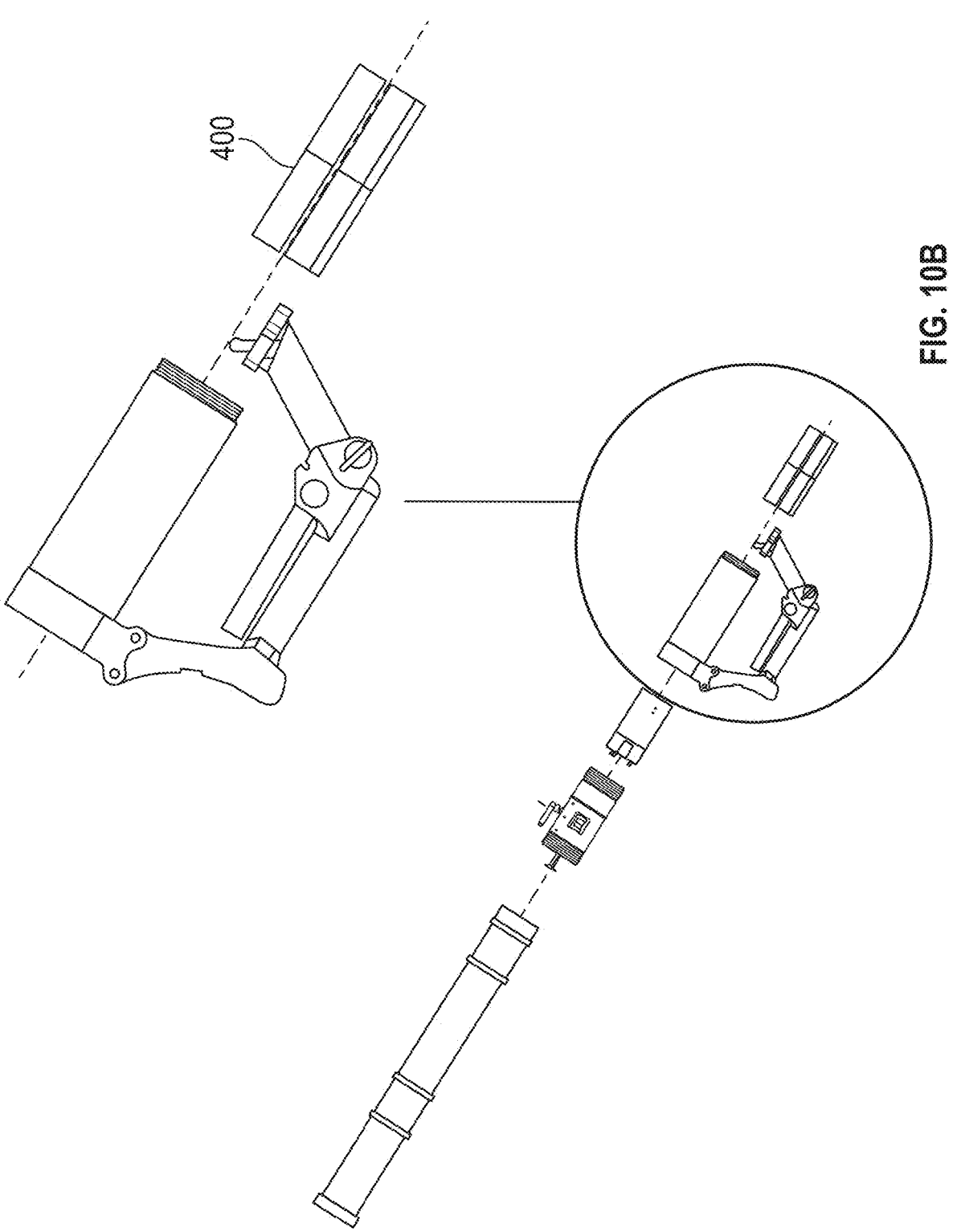
FIG. 10B illustrates a configuration of internal components and a trigger fire mechanism in a mortar according to some examples.

The relative position of the internal components may be different. For example, FIG. 10A is an illustration of a mortar barrel including a shot detector 200 and an electron- ics housing 300 according to some embodiments. The shot detector 200 and the electronics housing 300 may be coupled together. For example, the shot detector 200 may be threaded onto the electronics housing 300. In some embodiments, the shot detector may be contained in the electronics housing. The bottom of the electronics housing may be coupled to the top of the battery. FIG. 10B is an illustration of the mortar barrel of FIG. 10A including a battery 400. The battery 400 may be at the base of the mortar barrel and below the shot detector and the electronics housing.

The component arrangement of FIGS. 10A and 10B may be implemented in trigger fire-operated mortars, while the component arrangement of FIG. 9 may be implemented in drop fire-operated mortars. In trigger firing, the firing pin may be longer and may extend from the trigger to the top of the shot detector. As an example, a firing pin may be approximately 13 inches in length. The intervening components, such as the electronics housing and the shot detector, may include lengthwise channels to accommodate the firing pin. Since the battery is below the firing pin in this configuration, the battery does not need to include such a channel. This configuration can simplify the battery production and/ or allow for standard battery packages. In drop firing, the firing pin may be shorter and may only extend through the shot detector because there is no trigger mechanism. Components that are located below the shot detector, such as the battery and the electronics housing, therefore do not need to include a channel for the firing pin. The battery may be located between the electronics housing and the shot detector to simplify the geometric requirements for the battery and/or for wiring or power connection between the battery and the adjacent components.

Figure 11:
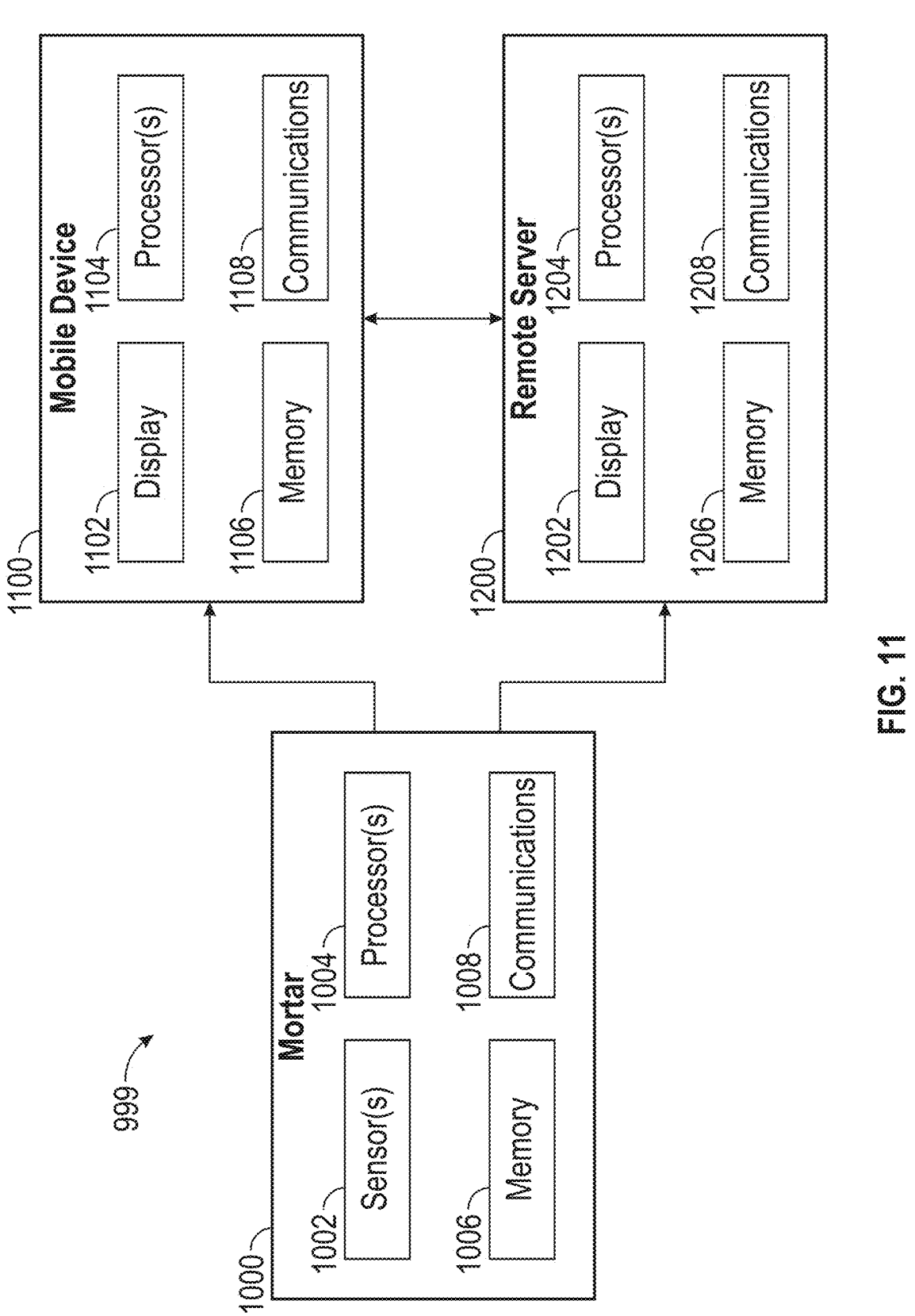
FIG. 11 illustrates a system for simulating mortar firing according to some examples.

FIG. 11 is an illustration of a mortar simulation system 999 for simulating a trajectory of an inert mortar projectile according to some embodiments. The system may include the mortar 1000, one or more mobile devices 1100, and a remote server 1200. The mortar 1000 may include one or more sensors 1002 as described herein, one or more processors 1004, and a memory 1006. The memory 1006 may store one or more programs. The one or more processors 1004 may be configured to execute the one or more programs. The memory 1006 and the one or more processors 1004 may be configured to perform one or more aspects of the method disclosed herein, such as determining an orientation of the mortar barrel when an inert mortar projectile is fired. The mortar 1000 may include a communications unit 1008. The communications unit 1008 may be configured to transmit data to one or more mobile devices 1100 (e.g., for local processing using additional compute resources) and/or one or more remote servers 1200 (e.g., for processing on the cloud).

The one or more mobile devices 1100 may be connected to the mortar 1000 using one or more wired or wireless electronic communication protocols, such as WiFi and/or Bluetooth. The one or more mobile devices 1100 may include local or nearby hardware devices (e.g., devices located within a local area network, within Bluetooth range, etc.), such as a mobile phone or PC. The one or more mobile devices 1100 may include a memory 1106, one or more processors 1104, a display 1102, and/or a communications unit 1108 (e.g., for receiving data from and transmitting data to mortar 1000). The memory 1106 may store one or more trained machine learning models trained to perform any of the inferencing tasks disclosed herein. The memory 1106 may include relatively more storage capacity than memory 1106 of the mortar 1000. The one or more processors 1104 may have more processing capabilities relative to the one or more processors 1004 of the mortar 1000. Accordingly, more complex analysis of the data collected using the mortar 1000 may be performed at the one or more mobile devices 1100. The one or more mobile devices 1100 may include a location sensor, e.g., a global positioning system (GPS) module. The location of a mobile device 1100 that is in proximity to the mortar 1000 may be used to simulate the trajectory of an inert mortar projectile fired from the mortar.

The one or more remote servers 1200 may be connected to the mortar 1000 and/or the mobile device 1100 using one or more wired or wireless electronic communication protocols. The one or more remote servers 1200 may be configured to operate a cloud computing environment. The one or more remote servers 1200 may include a memory 1206, one or more processors 1204, a display 1202, and/or a communications unit 1208 (e.g., for receiving data from and transmitting data to mortar 1000). The memory 1206 may include relatively more storage capacity than memory 1006 of the mortar 1000 and/or memory 1106 of mobile device 1100. The one or more processors 1204 may have more processing capabilities relative to the one or more processors 1004 of the mortar 1000 and/or the one or more processors 1104 of mobile device(s) 1100. Accordingly, more complex analysis of data may be performed at the one or more remote servers 1200.

It should be understood that any of the various methods disclosed herein may be performed using compute resources of the mortar, a local computing resource capable of receiving data from the mortar (e.g., a mobile phone, laptop, etc.), a cloud computing platform, or any combination thereof. In some examples the system 999 may utilize processing capabilities of a plurality of different devices to perform any of the methods disclosed herein. For example, a first remote server may request data from a second remote server through a remote procedure call in order to complete a process.

Figure 12:
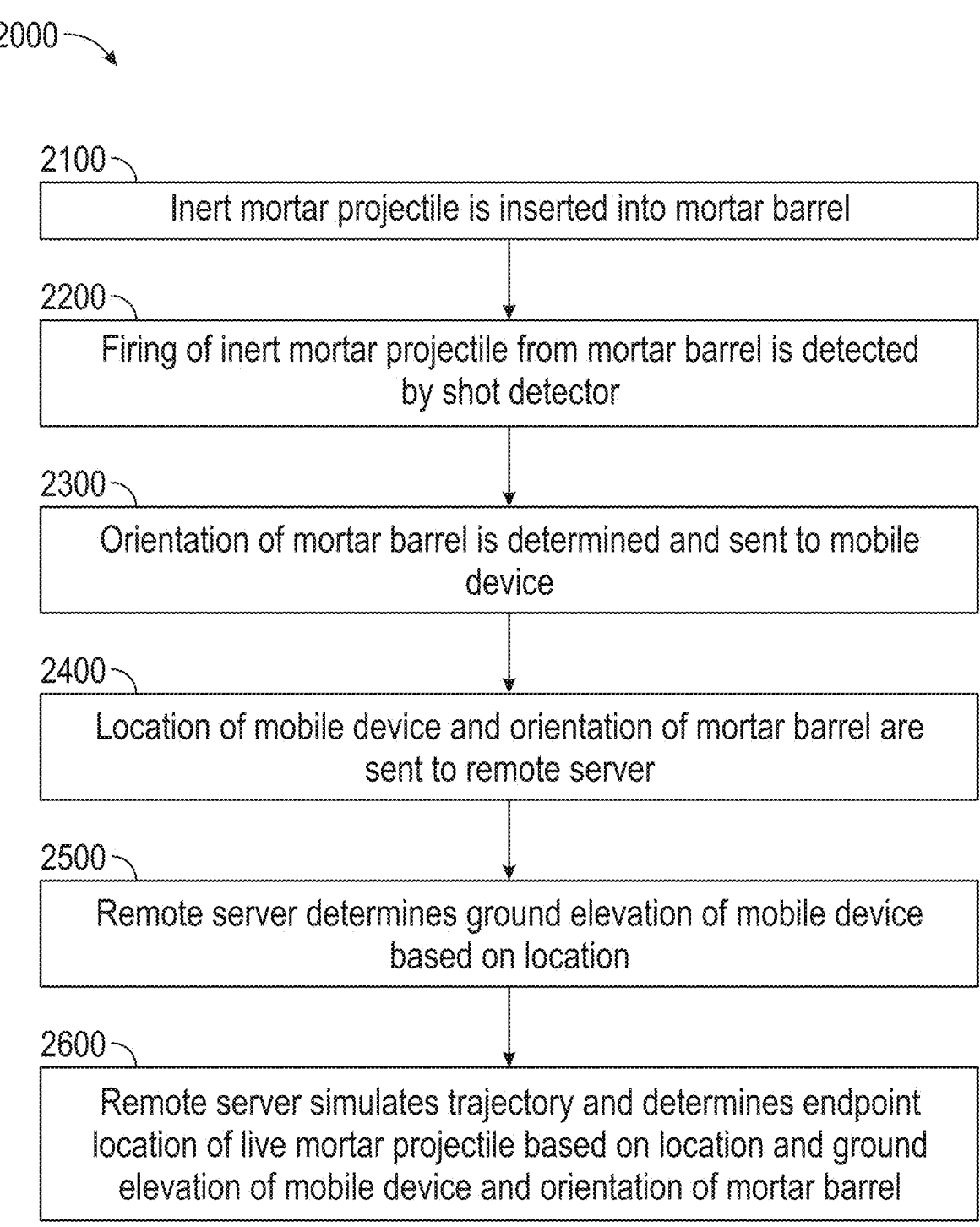
FIG. 12 illustrates a method for simulating mortar firing according to some examples.

FIG. 12 is a method 2000 of simulating a trajectory of an inert mortar projectile that is fired by the mortar 1000 according to some embodiments. The simulated trajectory may be a trajectory that a live mortar bomb would follow if it were fired from the same location and orientation as the mortar 1000. In step 2100, the inert mortar projectile may be inserted into the mortar barrel. The shot detector may detect the presence of the inert mortar projectile in the mortar barrel. In one example, the inert mortar projectile may depress a spring-mounted plunger in the mortar barrel that is connected to a shot detection sensor. In another example, the shot detector may include one or more barometric pressure sensors in the mortar barrel. The barometric pressure sensors may detect a change in barometric pressure inside the mortar barrel when the inert mortar projectile is inserted. In some embodiments, the shot detector sensor may transmit a first electronic signal to the processor indicating that the inert mortar projectile has been inserted into the mortar barrel.

In step 2200, the inert mortar projectile may be fired from the mortar barrel. The pneumatic cartridge of the inert mortar projectile may be punctured by a firing pin to actuate the firing of the inert mortar projectile. In a drop-firing configuration, the firing pin may extend past the shot detector such that the inert mortar projectile automatically contacts the firing pin when the inert mortar projectile is dropped in the mortar barrel. In a trigger-firing configuration, the firing pin may initially be retracted when the inert mortar projectile is dropped into the mortar barrel and may then be manually advanced via a trigger to contact the inert mortar projectile and actuate the firing. Users may be trained on one or both firing modes so that they are prepared to handle different types of live mortars. The shot detector may detect the firing of the inert mortar projectile and may transmit an electronic signal to a processor of the mortar indicating that the inert mortar projectile was fired. In one example, the shot detector may detect that the inert mortar projectile is fired when the spring-loaded plunger returns to its original (elevated) position. In another example, the shot detector may detect that the inert mortar projectile is fired based on a change in barometric pressure inside the mortar barrel (e.g., a pressure profile).

In step 2300, the processor in the mortar (or, in some embodiments, elsewhere) may determine an orientation (e.g., azimuth and/or elevation) of the mortar barrel when the inert mortar projectile was fired based on sensor data from the orientation sensors and may transmit the orientation data to a local device, e.g., a mobile device nearby. In some embodiments, the processor may determine the orientation in response to an electronic signal received from the shot detector. For example, after receiving an electronic signal from the shot detector indicating that an inert mortar projectile has been fired, the processor may request sensor data from the orientation sensors. In another embodiment, the processor may receive orientation data from the orientation sensors independently of any electronic signals from the shot detector. For example, the processor may receive sensor data from the orientation sensors as a continuous stream of data or at regular (or irregular) intervals of time. The processor may store sensor data that is received from the orientation sensor. The processor may receive an electronic signal from the shot detector indicating that an inert mortar projectile has been fired and may identify the most recent sensor data that was received within a certain time window (e.g., a few seconds or less) before or after the electronic signal was received. The most recent sensor data may be used as an approximation of the orientation of the mortar barrel when the inert mortar projectile was fired.

In some embodiments, the processor may transmit orientation data to the mobile device independently of the firing of an inert mortar projectile. For example, the processor may transmit orientation data to the mobile device as a continuous stream of data or at regular (or irregular) intervals of time. The processor may further transmit an electronic signal to the mobile device indicating that an inert mortar projectile has been fired from the mortar barrel. Upon receiving the electronic signal, the mobile device may identify the most recent orientation data that was received from the processor within a certain time window (e.g., a few seconds or less) before or after the electronic signal was received from the processor. The most recent orientation data may be used as an approximation of the orientation of the mortar barrel when the inert mortar projectile was fired.

In step 2400, the mobile device may determine its location and may transmit the location and the orientation data to a remote device, e.g., a remote server. The mobile device may transmit the location and the orientation data in a synchronized or combined transmission. For example, the mobile device may transmit the orientation data and the location data to the remote server in response to receiving the orientation data from the mortar. In some embodiments, the mobile device may transmit the location and the orientation data in separate transmissions. The mobile device may transmit its location to the remote server as a continuous stream of data or at regular (or irregular) intervals of time. The remote server may request location data from the mobile device one or more times. For example, the remote server may request location data from the mobile device when the mobile device establishes or re-establishes a connection with the remote server. In another example, the mobile device may transmit an indicator that the inert mortar projectile was fired to the remote server. The indicator may include the orientation data. The remote server may then request location data from the mobile device in response to receiving the indicator of inert mortar projectile firing. In some embodiments, the mobile device may receive the orientation data from the mortar and transmit the orientation data to the remote server. Upon receiving the orientation data, the remote server may access the most recent location data that was received from the mobile device within a certain time window (e.g., a few seconds to minutes) before or after the orientation data was received by the remote server. The remote server may use the most recent location data in combination with the orientation data to simulate the trajectory. The location of the mobile device (which is approximately the location of the mortar) is important because the ground elevation of the mortar may affect the simulated trajectory.

In some embodiments, the mobile device may transmit additional information to the remote server for the simulation. The additional information may include ballistics data such as a mortar model, a mortar projectile model or type, and/or target information. The ballistics data may be received by the mobile device as a user input. The ballistics data may be received by the mobile device from the mortar. In some embodiments, the ballistics data may be received from a sensor in the system, e.g., a sensor in the mortar or in the mobile device. For example, the inert mortar projectile may include a tag such as a QR code or a radiofrequency transmitter that can be scanned by a sensor (e.g., camera, radiofrequency receiver) in the mortar or the mobile device. The mortar or the mobile device may determine ballistics data about the inert mortar projectile by scanning the tag. As another example, the shot detector may determine information such as the size (dimensions, weight) of the inert mortar projectile when the inert mortar projectile is inserted and/or launched. In some embodiments, the size may be determined from the pressure profile generated by one or more barometric pressure sensors. In some embodiments, the size may be determined by the spring-loaded plunger, e.g., based on the speed and/or displacement of the plunger when the inert mortar projectile is inserted and/or fired.

In step 2500, the remote server may receive the location and orientation data and may determine a ground elevation of the mobile device (and the mortar) based on the location data. In some embodiments, the remote server may determine the ground elevation by requesting elevation data from a terrain service. The terrain service may be implemented on one or more remote devices, including a second remote server. The request for the elevation data may include the location of the mobile device, and the remote server may receive a ground elevation corresponding to the location included in the request. In some embodiments, the mobile device may determine the ground elevation and may transmit the ground elevation to the remote server along with the location data. The ground elevation may be relative to sea level or may be relative to a different baseline elevation.

In step 2600, the remote server may simulate the trajectory of a mortar bomb based on the location, the ground elevation, and the orientation of the mortar barrel. The orientation (elevation and azimuth) and ground elevation of the mortar barrel may be used to determine the initial line/vector of departure of the inert mortar projectile and/or a simulated mortar bomb. The trajectory and endpoint location can then be simulated based on the forces (e.g., gravity, drag, propulsion force, etc.) that would act on a live mortar bomb that is launched along the same initial line of departure. The remote server may also use ballistics data related to the mortar and/or inert mortar projectile to simulate the trajectory of the mortar bomb. For example, a simulated propulsion force may be calculated based on information about a size and/or quantity of charge(s) in the ballistics data. The simulated endpoint location may be a real-world location that is a certain distance from the location of the mobile device. The simulated endpoint location may include a ground elevation at the simulated endpoint location. The remote server may request the ground elevation at the simulated endpoint location from a terrain service. Determining the ground elevation at the simulated endpoint location improves the accuracy of damage simulation, described below.

In some embodiments, the remote server may simulate a type or degree of damage that would be caused by a live mortar bomb at the endpoint location based on ballistics data. The remote server may receive the ballistics data from the mobile device. The remote server may use ballistics data related to the mortar, inert mortar projectile, simulated mortar bomb, and/or the target information to simulate damage. The target information may include a presence and location of real or simulated targets, a posture of real or simulated targets (e.g., prone or standing), and/or any armor carried by the real or simulated targets. The remote server may use a physics engine to simulate an explosion of a live mortar bomb at the endpoint location and a trajectory and impact of shrapnel from the live mortar bomb. The simulated explosion may depend on the ballistics data, e.g., the type of mortar and/or the type of mortar bomb that is being simulated. The simulated explosion may then be compared to the target information to determine if any targets are hit and the degree of damage caused to the targets. The ground elevation at the simulated endpoint location may affect where the shrapnel lands in the damage simulation. In some embodiments, the remote server may transmit the damage simulation to another device. For example, a combat simulation may include two parties who are simulating the firing of live mortar bombs at each other using the mortar and inert mortar projectiles described herein. When a first party fires an inert mortar projectile, the remote server may receive orientation data, location data, and ballistics data from a first mobile device associated with the first party. The remote server may receive ballistics information (e.g., target information) about targets in the second party from a second mobile device associated with the second party. The remote server may simulate a trajectory of a mortar bomb and an amount of damage that a live mortar bomb along the trajectory would cause to targets in the second party based on the data from the first and second mobile devices. The remote server may transmit the damage simulation to the first mobile device associated with the first party and/or the second mobile device associated with the second party to enhance the combat simulation. In some embodiments, the remote server may transmit the damage simulation to another remote server or device.

Figure 13:
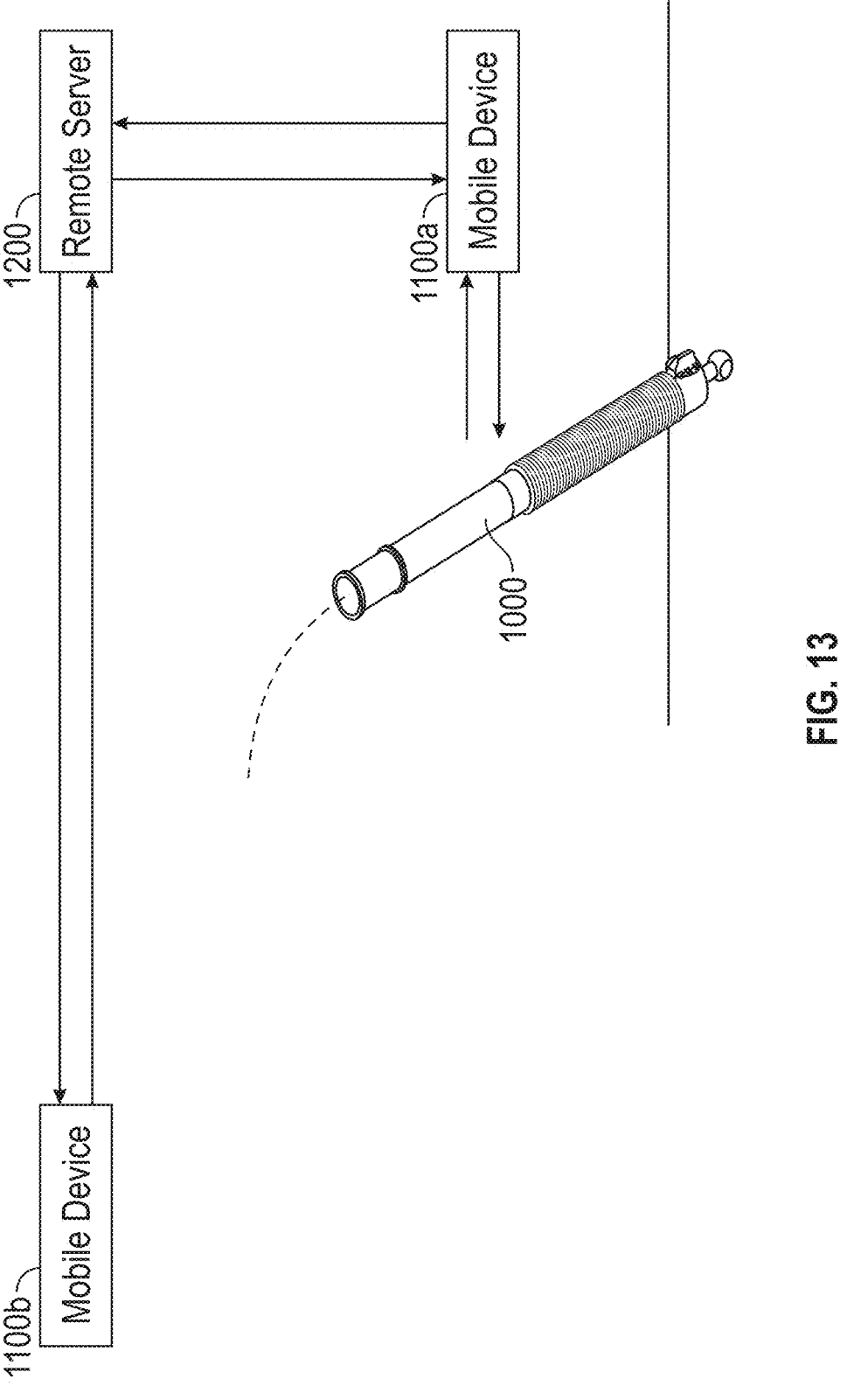
FIG. 13 illustrates a system for simulating mortar firing according to some examples.

FIG. 13 is a schematic of a simulation system including a mortar 1000, a first mobile device 1100a, a second mobile device 1100b, and a remote server 1200. The mortar 1000 may be in wireless communication with the first mobile device 1100a and may transmit orientation data to the first mobile device 1100a. The first mobile device 1100a may transmit data including the orientation data and location data to the remote server 1200 via a wireless communication protocol. The remote server 1200 may simulate a trajectory of a mortar bomb based on data received from the first mobile device 1100a. The remote server 1200 may request and receive data from other sources, such as additional servers through a remote procedure call, in order to simulate the trajectory. The remote server 1200 may further simulate damage caused by a live mortar bomb based on the simulated trajectory. The remote server 1200 may transmit data such as the simulated trajectory or damage to the first mobile device 1100a. In some embodiments, the remote server 1200 may be in wireless communication with a second mobile device 1100b. The remote server 1200 may transmit data such as the simulated trajectory or damage to the second mobile device 1100b.

Figure 14:
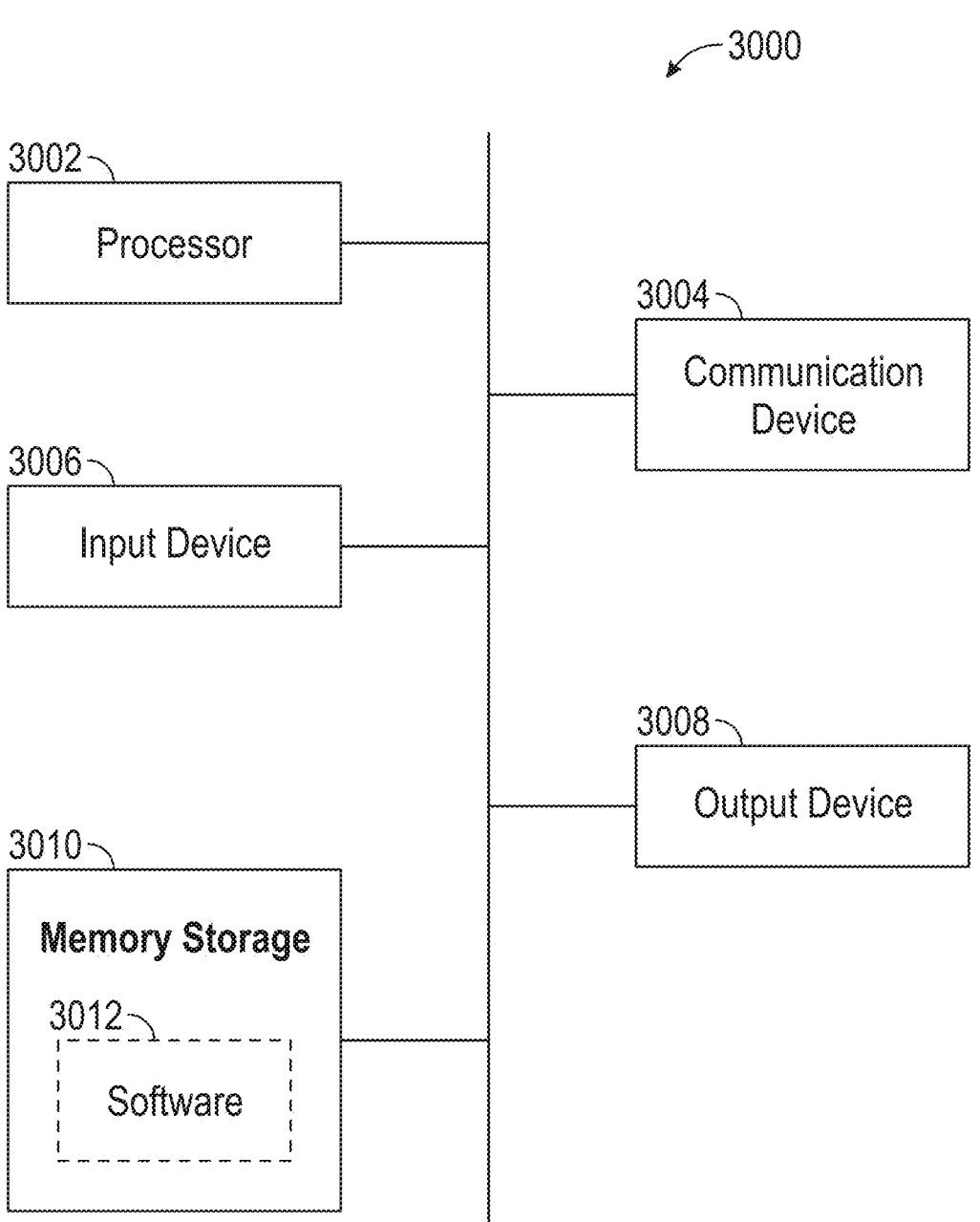
FIG. 14 illustrates a computing device according to some examples.

FIG. 14 depicts an exemplary computing device 3000, in accordance with one or more examples of the disclosure. Device 3000 can be a host computer connected to a network. Device 3000 can be a client computer or a server. As shown in FIG. 14, device 3000 can be any suitable type of microprocessor-based device, such as a personal computer, workstation, server, or handheld computing device (portable electronic device) such as a phone or tablet. The device can include, for example, one or more of processors 3002, input device 3006, output device 3008, storage 3010, and communication device 3004.

Input device 3006 and output device 3008 can generally correspond to those described above and can either be connectable or integrated with the computer. Input device 3006 can be any suitable device that provides input, such as a touch screen, keyboard or keypad, mouse, or voice-recognition device. Output device 3008 can be any suitable device that provides output, such as a touch screen, haptics device, or speaker. Storage 3010 can be any suitable device that provides storage, such as an electrical, magnetic, or optical memory, including a RAM, cache, hard drive, or removable storage disk. Communication device 3004 can include any suitable device capable of transmitting and receiving signals over a network, such as a network interface chip or device. The components of the computer can be connected in any suitable manner, such as via a physical bus or wirelessly.

Software 3012, which can be stored in storage 3010 and executed by processor 3002, can include, for example, the programming that embodies the functionality of the present disclosure (e.g., as embodied in the devices as described above). Software 3012 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions.

In the context of this disclosure, a computer-readable storage medium can be any medium, such as storage 3010, that can contain or store programming for use by or in connection with an instruction execution system, apparatus, or device.

Software 3012 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 3000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 3000 can implement any operating system suitable for operating on the network. Software 3012 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

Finally, the entire disclosure of the patents and publications referred to in this application are hereby incorporated herein by reference.

The invention claimed is:

1. A mortar training device, comprising:
a barrel body comprising a bore;
a shot detector contained in the barrel body and comprising a shot detection sensor and configured to output an electronic signal indicating a firing of an inert mortar projectile from the barrel body;
a battery;
a plurality of orientation sensors contained in the barrel body; and
one or more processors and memory storing instructions that, when executed by the one or more processors, cause the one or more processors to:
receive the electronic signal from the shot detection sensor indicating that the inert mortar projectile is fired from the barrel body, and
determine an elevation of the barrel body and an azimuth of the barrel body when the inert mortar projectile is fired from the barrel body based on sensor data received from the plurality of orientation sensors.

2. The mortar training device of claim 1, wherein the shot detector comprises a spring and the shot detector is configured to output the electronic signal based on a compression state of the spring.

3. The mortar training device of claim 1, wherein the shot detection sensor comprises a barometric pressure sensor and is configured to output the electronic signal based on a barometric pressure data of an interior of the barrel body.

4. The mortar training device of claim 3, wherein the barometric pressure data comprises an instantaneous barometric pressure.

5. The mortar training device of claim 3, wherein the barometric pressure data comprises a time curve of barometric pressure.

6. The mortar training device of claim 1, further comprising a firing pin extending lengthwise internally along a portion of the barrel body.

7. The mortar training device of claim 6, wherein the firing pin extends through a channel in the shot detector.

8. The mortar training device of claim 7, wherein the firing pin is connected to a trigger and the trigger is configured to move the firing pin in a longitudinal direction past the shot detector.

9. The mortar training device of claim 7, wherein the firing pin extends past the shot detector and is fixed in place.

10. The mortar training device of claim 1, wherein the instructions further cause the one or more processors to transmit the elevation and the azimuth to a remote device.

11. The mortar training device of claim 1, wherein the barrel body includes a first barrel section having a first threaded end and a second barrel section having a second threaded end, the first threaded end and the second threaded end being configured to mate with each other.

12. The mortar training device of claim 11, wherein the battery is contained in the barrel body at a mating location of the first barrel section and the second barrel section.

13. The mortar training device of claim 1, further comprising an electronics housing containing the plurality of orientation sensors and the one or more processors.

14. The mortar training device of claim 13, wherein the electronics housing is at a base of an interior of the barrel body and an outer surface of the electronics housing includes a raised projection configured to fit in a corresponding slot in an inner surface of the barrel body.

15. The mortar training device of claim 14, further comprising a threaded collar configured to fit over an upper section of the electronics housing and between the electronics housing and the inner surface of the barrel body to secure a position of the electronics housing in the barrel body.

16. The mortar training device of claim 13, wherein the battery is located between the electronics housing and the shot detector.

17. The mortar training device of claim 13, wherein the electronics housing is located between the battery and the shot detector.

18. A method of mortar training, the method performed using a mortar training device comprising a barrel body comprising a bore; a shot detector contained in the barrel body and comprising a shot detection sensor and configured to output an electronic signal indicating a firing of an inert mortar projectile from the barrel body; a battery; a plurality of orientation sensors contained in the barrel body; and one or more processors and memory, the method comprising:
receiving the electronic signal from the shot detection sensor indicating that the inert mortar projectile is fired from the barrel body, and
determining an elevation of the barrel body and an azimuth of the barrel body when the inert mortar projectile is fired from the barrel body based on sensor data received from the plurality of orientation sensors.

19. A simulation system for simulating firing of a mortar bomb, comprising:
a mortar training device comprising:
a barrel body comprising a bore;
a shot detector contained in the barrel body and comprising a shot detection sensor and configured to output an electronic signal indicating a firing of an inert mortar projectile from the barrel body;
a battery; and
a plurality of orientation sensors contained in the barrel body;
the inert mortar projectile;
a mobile device; and
a computing system comprising a memory and one or more processors, wherein the memory stores one or more programs that when executed by the one or more processors, cause the one or more processors to:

receive orientation data, the orientation data including an elevation and an azimuth of the barrel body when the inert mortar projectile is fired from the barrel body;

receive location data including a location of the mobile device;

determine a ground elevation of the mobile device based on the location data;

simulate a trajectory of a mortar bomb from a mortar based on the orientation data and the ground elevation of the mobile device; and determine a simulated impact location of the mortar bomb based on the simulated trajectory.

20. The simulation system of claim 19, wherein the one or more programs when executed further cause the one or more processors to simulate the trajectory based on data indicating at least one of a projectile type of the inert mortar projectile, a simulated firing charge associated with the inert mortar projectile, and a model type of the mortar.

21. The simulation system of claim 20, wherein the data indicating the projectile type is received from a sensor in the mortar training device or the mobile device.

22. The simulation system of claim 19, wherein the one or more programs when executed further cause the one or more processors to determine a ground elevation at the simulated impact location.

23. The simulation system of claim 22, wherein the one or more programs when executed further cause the one or more processors to simulate damage caused by the mortar bomb based on the simulated impact location and the ground elevation at the simulated impact location.

24. The simulation system of claim 23, wherein the one or more programs when executed further cause the one or more processors to transmit the simulated damage to the mobile device.

25. The simulation system of claim 23, wherein the one or more programs when executed further cause the one or more processors to receive a target location and simulate the damage based on the simulated impact location, the ground elevation at the simulated impact location, and the target location.

26. The simulation system of claim 19, wherein the inert mortar projectile includes a plastic body and at least one metal insert within the plastic body.

27. The simulation system of claim 19, wherein the one or more programs when executed further cause the one or more processors to receive an indication that the inert mortar projectile was fired from the barrel body and to responsively transmit a request for the location data to the mobile device.

28. The simulation system of claim 19, wherein the computing system comprises a remote server configured to communicate with the mobile device via a wireless communication protocol.

29. A method of using a simulation system for simulating firing of a mortar bomb, the simulation system comprising a mortar training device comprising a barrel body comprising a bore, a shot detector contained in the barrel body and comprising a shot detection sensor and configured to output an electronic signal indicating a firing of an inert mortar projectile from the barrel body, a battery, and a plurality of orientation sensors contained in the barrel body; the inert mortar projectile; a mobile device; and a computing system comprising a memory and one or more processors, the method comprising:

receiving orientation data, the orientation data including an elevation and an azimuth of the barrel body when the inert mortar projectile is fired from the barrel body;

receiving location data including a location of the mobile device;

determining a ground elevation of the mobile device based on the location data;

simulating a trajectory of a mortar bomb from a mortar based on the orientation data and the ground elevation of the mobile device; and determining a simulated impact location of the mortar bomb based on the simulated trajectory.

* * * * *